United States Patent
Bai et al.

(10) Patent No.: US 11,025,797 B2
(45) Date of Patent: *Jun. 1, 2021

(54) PREDICTING DETECTABILITY AND GRADING PRIOR TO PRINTING

(71) Applicant: Digimarc Corporation, Beaverton, OR (US)

(72) Inventors: Yang Bai, Beaverton, OR (US); Dean H. Chadwick, Beaverton, OR (US); Jackson B. Bennett, Lake Oswego, OR (US); Daniel T. Pinard, Corvallis, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,415

(22) Filed: Apr. 25, 2019

(65) Prior Publication Data

US 2019/0327382 A1    Oct. 24, 2019

Related U.S. Application Data

(63) Continuation of application No. 15/918,924, filed on Mar. 12, 2018, now Pat. No. 10,382,645.

(60) Provisional application No. 62/628,193, filed on Feb. 8, 2018, provisional application No. 62/470,132, filed on Mar. 10, 2017.

(51) Int. Cl.
| | |
|---|---|
| *H04N 1/60* | (2006.01) |
| *G06T 1/00* | (2006.01) |
| *H04N 1/32* | (2006.01) |
| *G06F 3/12* | (2006.01) |
| *G06K 15/02* | (2006.01) |

(52) U.S. Cl.
CPC ....... *H04N 1/32251* (2013.01); *G06T 1/0028* (2013.01); *H04N 1/32309* (2013.01); *H04N 1/6008* (2013.01); *G06T 2201/0202* (2013.01)

(58) Field of Classification Search
None
See application file for complete search history.

(56) References Cited

U.S. PATENT DOCUMENTS

| | | | |
|---|---|---|---|
| 5,394,483 | A | 2/1995 | Daly |
| 5,862,260 | A | 1/1999 | Rhoads |
| 5,905,819 | A | 5/1999 | Daly |
| 5,933,578 | A | 8/1999 | Van De Capelle |
| 6,122,403 | A | 9/2000 | Rhoads |

(Continued)

FOREIGN PATENT DOCUMENTS

| | | |
|---|---|---|
| GB | 2435572 | 8/2007 |
| WO | 2016025631 A1 | 2/2016 |
| WO | 2018165667 | 9/2018 |

OTHER PUBLICATIONS

"Estimating Spectral Reflectances of Digital Artwork", Farrell et al, 1999. (8 pages).

(Continued)

*Primary Examiner* — Beniyam Menberu
(74) *Attorney, Agent, or Firm* — Digimarc Corporation

(57) ABSTRACT

The present disclosure relates generally to image signal processing, including encoding signals for image data or artwork. A color blend/print model is used to predict signal detectability and visibility as is printed on a particular substrate, which facilitates object grading prior to print runs.

18 Claims, 20 Drawing Sheets

(56) References Cited

U.S. PATENT DOCUMENTS

| | | |
|---|---|---|
| 6,345,104 B1 | 2/2002 | Rhoads |
| 6,408,082 B1 | 6/2002 | Rhoads |
| 6,449,377 B1 | 9/2002 | Rhoads |
| 6,483,607 B1 | 11/2002 | Van De Capelle |
| 6,590,996 B1 | 7/2003 | Reed |
| 6,614,914 B1 | 9/2003 | Rhoads |
| 6,631,198 B1 | 10/2003 | Hannigan |
| 6,718,046 B2 | 4/2004 | Reed |
| 6,763,123 B2 | 7/2004 | Reed |
| 6,891,959 B2 | 5/2005 | Reed |
| 6,912,295 B2 | 6/2005 | Reed |
| 6,947,571 B1 | 9/2005 | Rhoads |
| 7,016,042 B2 | 3/2006 | Edge |
| 7,054,461 B2 | 5/2006 | Zeller |
| 7,110,142 B2 | 9/2006 | Mestha |
| 7,123,380 B2 | 10/2006 | Van De Capelle |
| 7,199,903 B2 | 4/2007 | Van De Capelle |
| 7,286,685 B2 | 10/2007 | Brunk |
| 7,352,878 B2 | 4/2008 | Reed |
| 7,397,582 B2 | 7/2008 | Tin |
| 7,738,142 B2 | 6/2010 | Edge |
| 7,738,148 B2 | 6/2010 | Edge |
| 7,773,256 B2 | 8/2010 | Edge |
| 7,783,130 B2 | 8/2010 | Watson |
| 7,889,390 B2 | 2/2011 | Wang |
| 7,940,393 B2 | 5/2011 | Noy |
| 8,085,434 B2 | 12/2011 | Bala |
| 8,094,869 B2 | 1/2012 | Reed |
| 8,144,368 B2 | 3/2012 | Rodriguez |
| 8,199,969 B2 | 6/2012 | Reed |
| 8,610,958 B2 | 12/2013 | Rossier |
| 9,117,268 B2 | 8/2015 | Reed |
| 9,224,184 B2 | 12/2015 | Bai |
| 9,347,874 B2 | 5/2016 | Keydar |
| 9,380,186 B2 | 6/2016 | Reed |
| 9,401,001 B2 | 7/2016 | Reed |
| 9,449,357 B1 | 9/2016 | Lyons |
| 9,565,335 B2 | 2/2017 | Reed |
| 9,582,844 B2 | 2/2017 | Reed |
| 9,635,378 B2 | 4/2017 | Holub |
| 9,667,829 B2 | 5/2017 | Bai |
| 9,690,967 B1 | 6/2017 | Brundage |
| 9,716,807 B2 | 7/2017 | Holub |
| 9,747,656 B2 | 8/2017 | Stach |
| 9,767,396 B2 | 9/2017 | Deshpande |
| 9,864,919 B2 | 1/2018 | Reed |
| 10,217,182 B1 | 2/2019 | Holub |
| 10,382,645 B2* | 8/2019 | Bai ............... H04N 1/32309 |
| 10,506,128 B1 | 12/2019 | Chadwick |
| 10,593,007 B1 | 3/2020 | Long |
| 2002/0145043 A1* | 10/2002 | Challa ............ G06Q 20/3274 235/462.01 |
| 2005/0036163 A1 | 2/2005 | Edge |
| 2005/0083346 A1 | 4/2005 | Takahashi |
| 2005/0083540 A1 | 4/2005 | Hersch |
| 2006/0165311 A1 | 7/2006 | Watson |
| 2010/0142003 A1 | 6/2010 | Braun |
| 2010/0150434 A1 | 6/2010 | Reed |
| 2012/0067955 A1* | 3/2012 | Rowe ............... G06K 7/1417 235/454 |
| 2012/0090488 A1 | 4/2012 | Postle |
| 2012/0099157 A1 | 4/2012 | Wurster |
| 2012/0211555 A1* | 8/2012 | Rowe ............... G06K 7/1404 235/375 |
| 2013/0289941 A1 | 10/2013 | Keydar |
| 2013/0329006 A1 | 12/2013 | Boles |
| 2014/0119593 A1 | 5/2014 | Filler |
| 2015/0156369 A1* | 6/2015 | Reed ............... H04N 1/32251 382/100 |
| 2016/0198064 A1* | 7/2016 | Bai ............... H04N 1/32309 382/100 |
| 2016/0217547 A1 | 7/2016 | Stach |
| 2016/0275639 A1 | 9/2016 | Holub |
| 2017/0024840 A1 | 1/2017 | Holub |
| 2017/0339302 A1 | 11/2017 | Rhoads |
| 2018/0129847 A1 | 5/2018 | Brundage |
| 2019/0182951 A1* | 6/2019 | Ellinger ............... H05K 1/0269 |
| 2020/0228675 A1 | 7/2020 | Chadwick |

OTHER PUBLICATIONS

Chung, R., Riordan, M. and Prakhya S. (2008) Predictability of spot colour overprints, Advances in Printing and Media Technology, VI. XXXV, p. 373-380.

Deshpande et al., "White paper on predicting the colorimetry of spot colour overprints," CC Graphic Arts Colour Experts' Day, Frankfurt Jun. 12, 2013, 24 pages, retrieved from the Internent on Aug. 14, 2018 at: http://www.color.org/events/frankfurt/Deshpande_ ICCFrankfurt2013_Spot_colour_overprint.pdf.

Deshpande, K. and Green, P. (2010), "A simplified method of predicting the colorimetry of sot colour overprints," Proc. 18th Color Imaging Conference: Color Science and Engineering Systems, Technologies, and Applications, p. 213-216, San Antonio, Texas.

Dfimbeg-Malcic et al., "Kubelka-Munk Theory in Describing Optical Properties of Paper (I)," Technical Gazette 18, 1(2011), 117-124.

Hersch, et. al. "Improving the Yule-Nielsen modified spectral Neugebauer model by dot surface coverages depending on the ink superposition conditions," Electronic Imaging Symposium, Conf. Imaging X: Processing, Hardcopy and Applications, Jan. 2005, SPIE vol. 5667, 434-445.

Hunterlab. (2008). The Kubelka-Munk theory and K/S, insight on color. Application Note, vol. 18, 7. (3 pages).

International Search Report and Written Opinion for Application No. PCT/US2018/022047 (published as W02108165667 Al), dated Jul. 30, 2018, 16 pages.

Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.

J.A.C. Yule, W.J. Nielsen, "The penetration of light into paper and its effect on halftone reproductions," Proc. TAGA, vol. 3, 65-76 (1951).

Kubelka, P. and Monk, "An Article on Optics of Paint Layers," F., Z tech. Physik, 12, 493 (1931), English Translation by Stephen H. Westin, revised Mar. 12, 2004. (16 pages).

Scott J. Daly, "Visible differences predictor: an algorithm for the assessment of image fidelity", Proc. SPIE 1666, Human Vision, Visual Processing, and Digital Display III, 2 (Aug. 27, 1992); doi:10.1117/12.135952. (14 pages).

U.S. Appl. No. 15/154,529, filed May 13, 2016. (90 pages).
U.S. Appl. No. 15/441,006, filed Feb. 23, 2017. (95 pages).
U.S. Appl. No. 15/816,098, filed Nov. 17, 2017 (67 pages).
U.S. Appl. No. 62/470,132, filed Mar. 10, 2017. (47 pages).
U.S. Appl. No. 62/628,193, filed Feb. 8, 2018. (70 pages).

Wyble et al., "A critical review of spectral models applied to binary color printing," Color Research & Application, 25(1):4-19, 2000.

X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif, USA, Jun. 1996.

Zuffi, S. (2004). Estimating Surface Reflectance Functions from Tristimulus Values. (8 pages).

Dec. 2, 2020 Amendment and Aug. 11, 2020 non-final Office Action, both from U.S. Appl. No. 16/708,277, filed Dec. 12, 2019 (published US 20200228675). 34 pgs.

International Preliminary Report on Patentability Chapter I, for PCT Application No. PCT/US2018/022047 (published as WO 2018/ 165667), dated Sep. 10, 2019. 11 pages.

Jun. 2, 2020 Reply to ISR in European patent application No. 18716029.6, which is the European regional phase of PCT Application No. PCT/US2018/022047 (published as WO 2018/165667), including corresponding amended European claims. 9 pages.

Written Opinion for Application No. PCT/US2018/022047 (published as WO 2018/165667), dated Apr. 24, 2018, 7 pages.

* cited by examiner

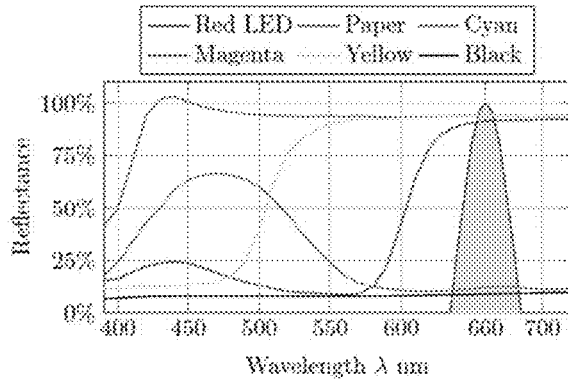
FIG. 1A
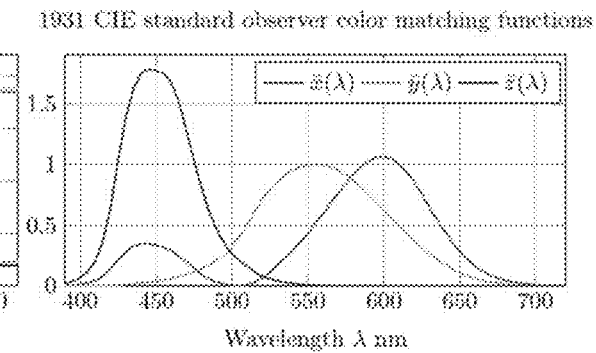
FIG. 1B
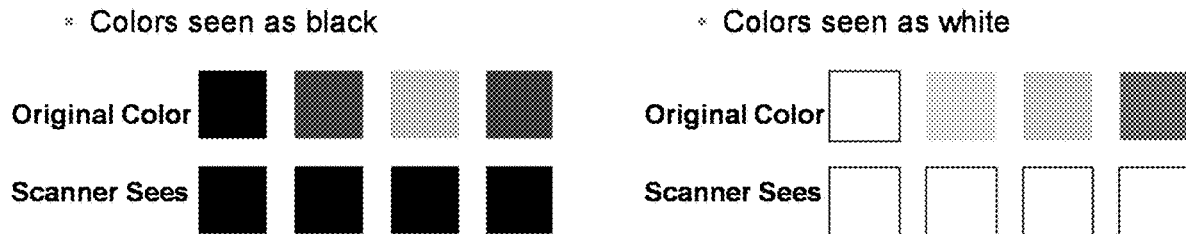
Fig. 2A
FIG. 2B
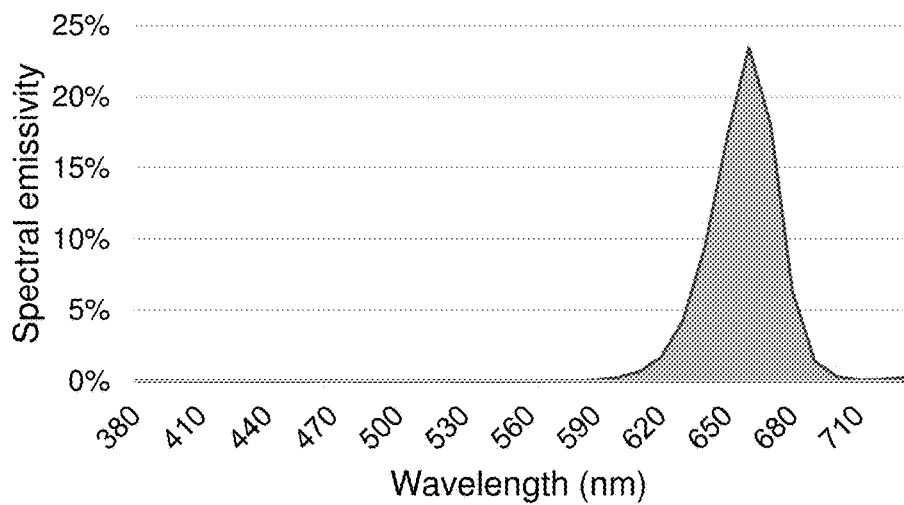
Fig. 3

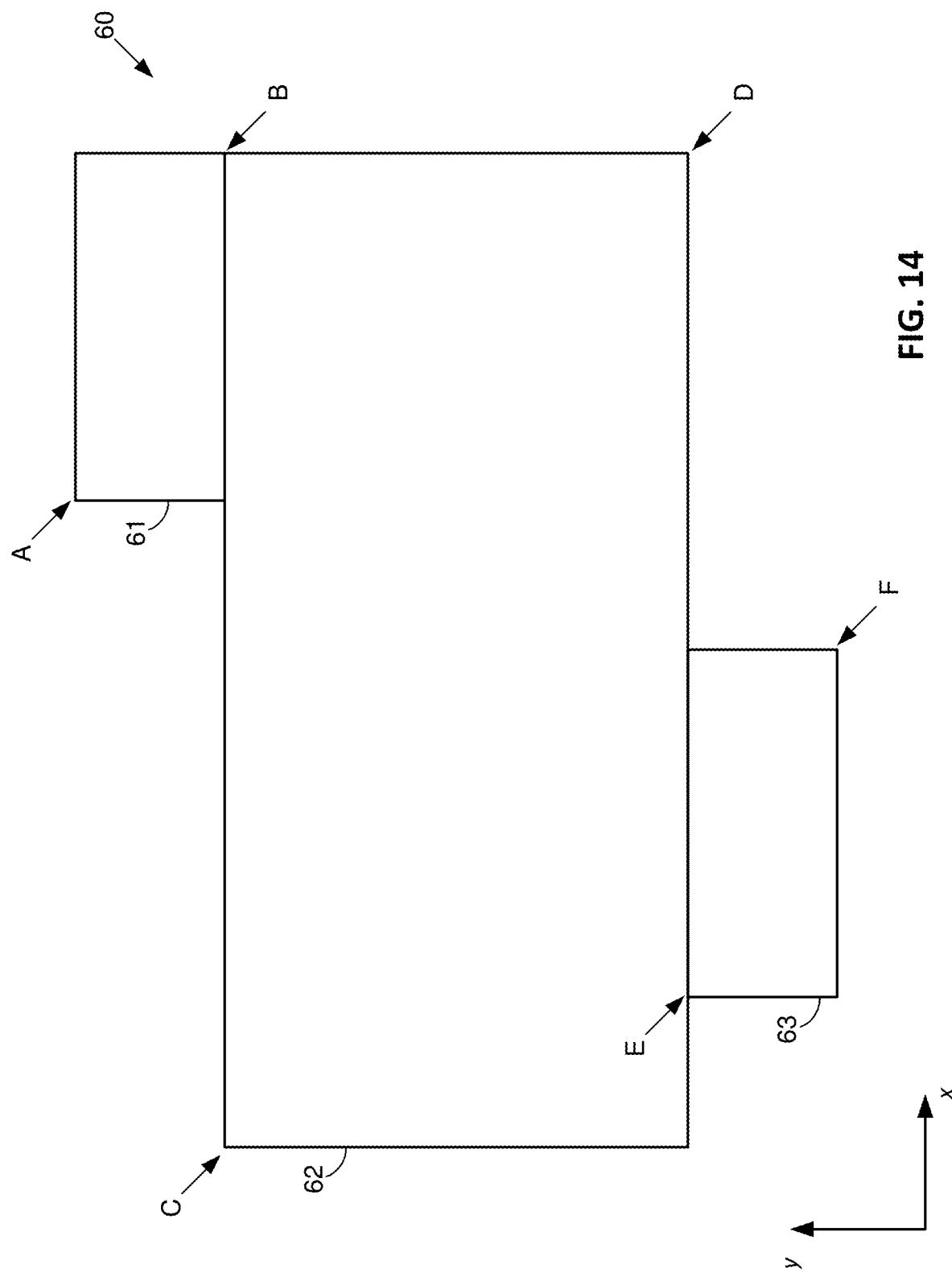

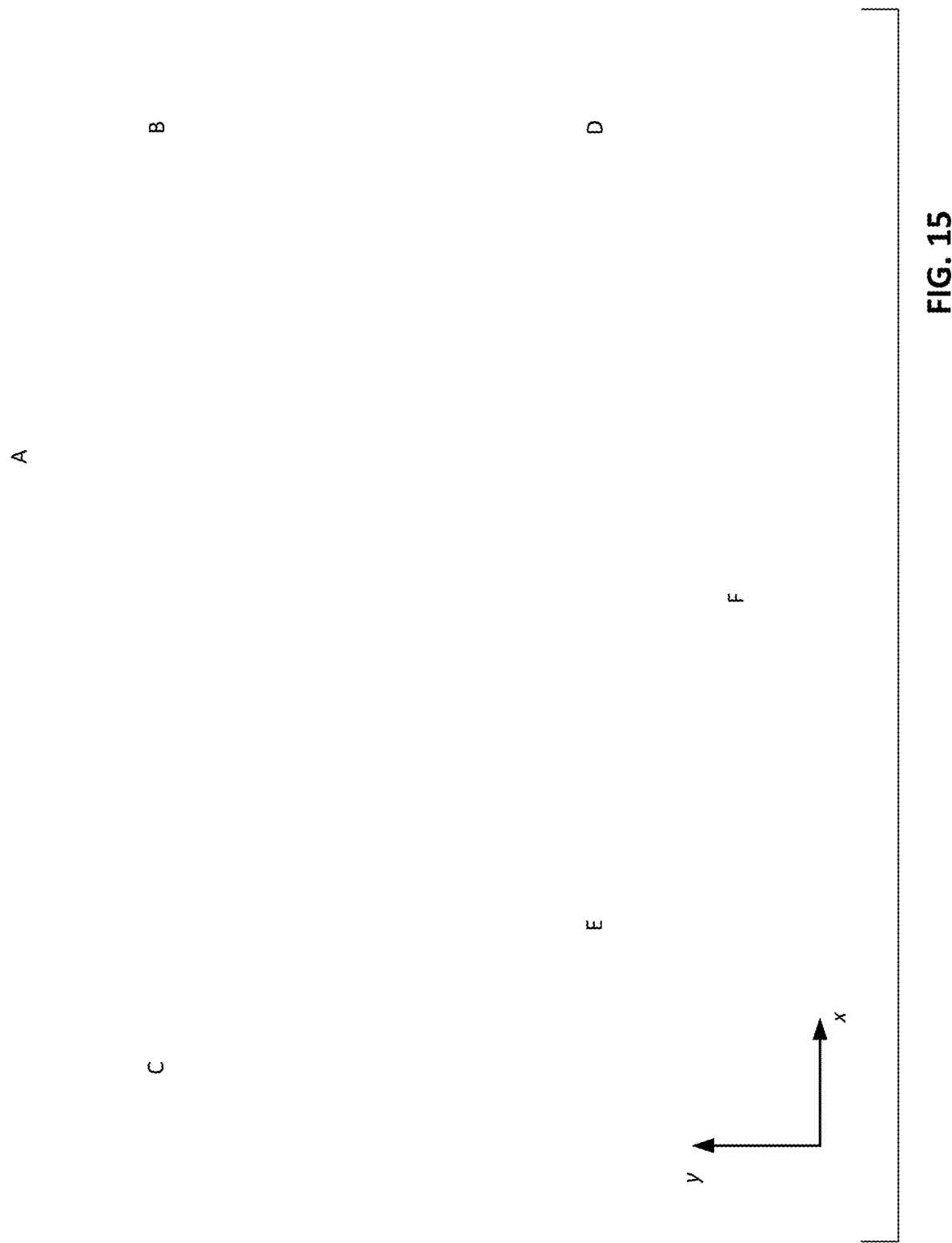

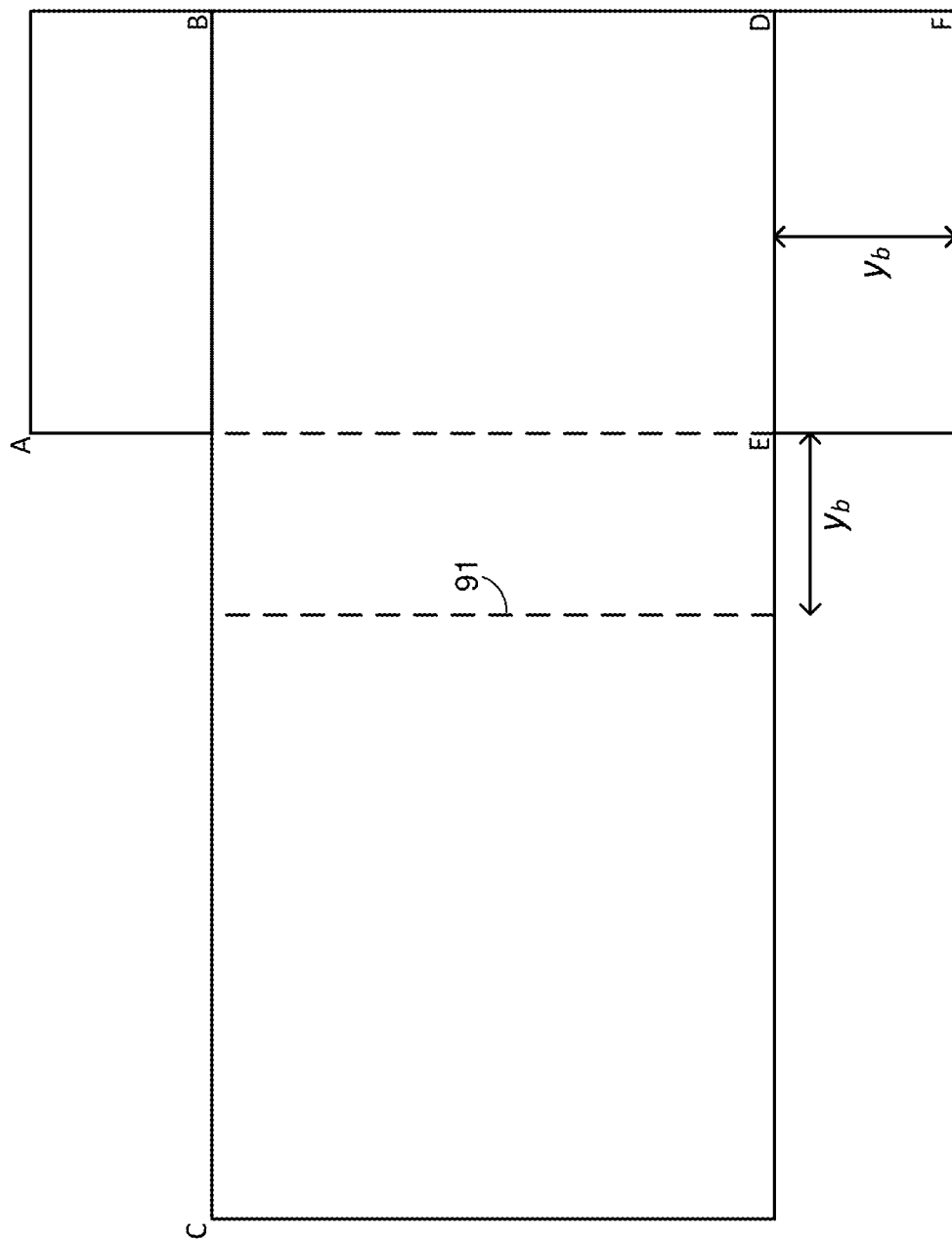

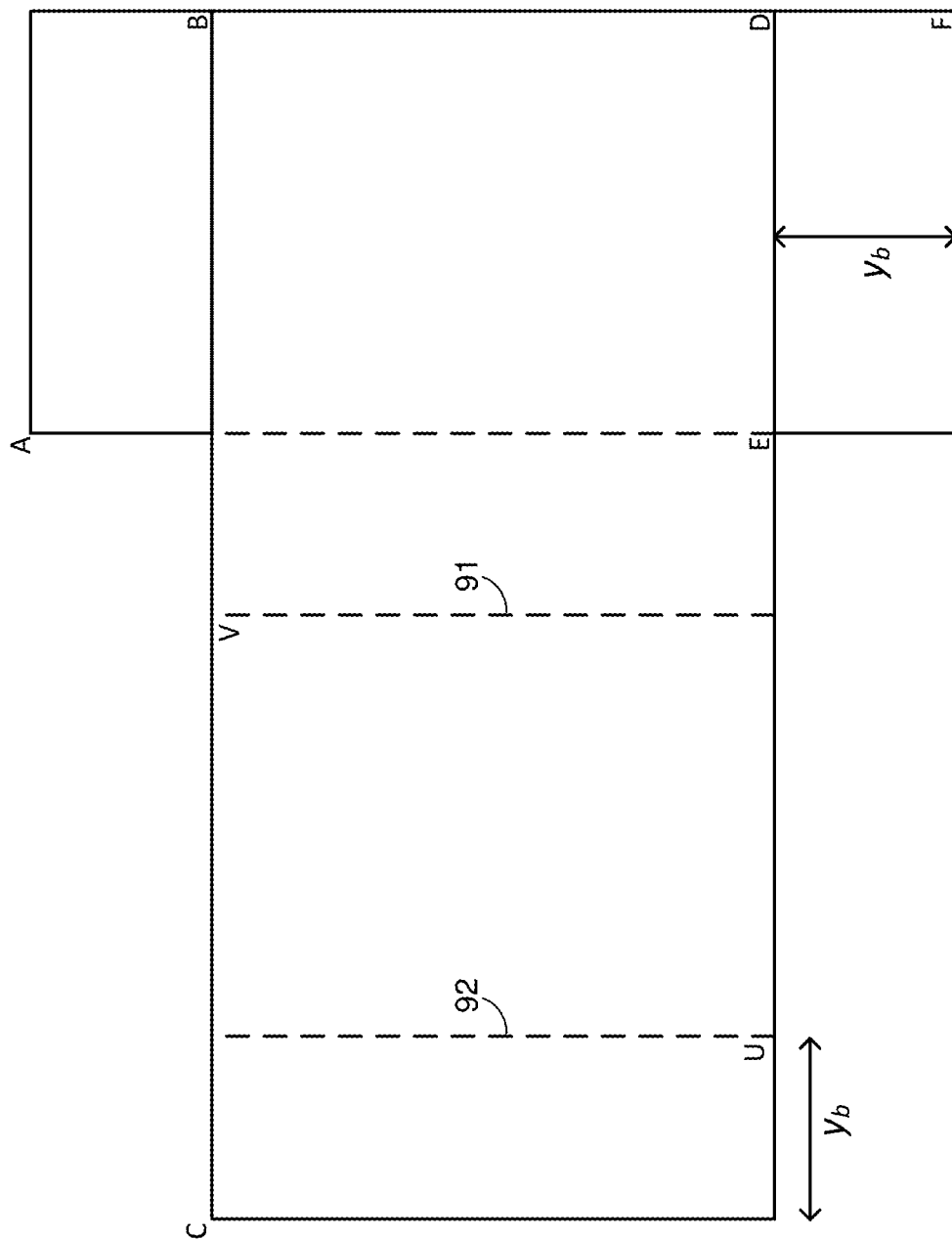

PREDICTING DETECTABILITY AND GRADING PRIOR TO PRINTING

RELATED APPLICATION DATA

This application is a continuation of U.S. patent application Ser. No. 15/918,924, filed Mar. 12, 2018 (issued as U.S. Pat. No. 10,382,645), which claims priority to U.S. Provisional Application Nos. 62/470,132, filed Mar. 10, 2017, and 62/628,193, filed Feb. 8, 2018. This application is also related to U.S. Pat. Nos. 9,117,268, 9,224,184, 9,380,186, 9,401,001, 9,565,335 and 9,690,967, US Published Patent Application Nos. 2016-0198064, 20160217547, 20160275639, and 20170024840, and U.S. patent application Ser. No. 15/441,006, filed Feb. 23, 2017 (U.S. Pat. No. 10,262,176). Each of the above patent documents is hereby incorporated herein by reference in its entirety.

TECHNICAL FIELD

The present disclosure relates generally to advanced image signal processing technology, color science, signal encoding and digital watermarking, particularly for product packaging and other printed objects.

BACKGROUND AND SUMMARY

We've heard some commentary suggesting that printing is as much an art as it is a science. But when you're changing a digital design to include an encoded signal, and then sending it to print, you would like to remove as much guesswork as possible. It becomes important to accurately predict or model how various print colors will interact or "blend" with one another, e.g., when overprinted onto one another on various different types of substrates. An inaccurate prediction at the design stage can result in a design that is subpar in terms of poor encoded signal robustness (e.g., low encoded signal detection) and high signal visibility. That is, a poor ink blend prediction can result in an aesthetically ugly design that doesn't detect very well. Moreover, it's important to establish an objective grade for the encoded signal instead of relying on guesswork or instinct.

We've developed technology, methods and systems to help predict how an information signal encoded design will behave, e.g., in terms of robustness and/or visibility, once printed on various different substrates.

"Digital watermarking" is a form of signal encoding. For purposes of this disclosure, the terms "digital watermark(ing)," and "watermark" are used interchangeably. We sometimes use the terms "embedding," "embed," "signal encoding," and "encoding" (and variants thereof) to mean modulating or transforming data representing imagery, audio or video to include information therein. For example, signal encoding may seek to encode an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry or convey the information signal. One way to modulate a host signal is to combine or overprint a first color with additional colors. One or more of the colors, or the color combination itself, may carry or represent the information signal. Another way to impart encoded data to an image, artwork or design is to print a so-called sparse digital watermark pattern, e.g., in open space or over a background. Additional details regarding sparse watermarking is found in assignee's U.S. Pat. No. 9,635,378, which is incorporated herein by reference in its entirety. We use the terms "decode," "detect," and "read" (and variants thereof) interchangeably to mean detecting and/or recovering an encoded signal such as a digital watermark.

Some of the present assignee's work in steganography, signal encoding and digital watermarking is reflected, e.g., in U.S. Pat. Nos. 9,565,335, 9,449,357; 9,401,001; 9,380,186; 8,199,969, 6,947,571; 6,912,295; 6,891,959. 6,763,123; 6,718,046; 6,614,914; 6,590,996; 6,449,377, 6,408,082; 6,345,104; 6,122,403 and 5,862,260; and US Published Patent Application Nos. US 2017-0024840 A1, US 2016-0316098 A1, US 2016-0275639 A1 and US 2013-0329006 A1. Each of the patent documents in this paragraph is hereby incorporated by reference herein in its entirety.

This disclosure describes an image processing system and related methods which provide improved encoded signal prediction in view of real-world constraints, e.g., printing press variations, ink overprint estimations, object geometry, etc.

This disclosure also details prediction systems, apparatus and methods to predict how various colors will interact or "blend" with one another, e.g., when printed over various different types of substrates and color layers, in connection with signal encoding utilizing so-called spot colors and process colors.

This disclosure further describes technology for establishing an objective multi-sided grade for packages including encoded signals.

Now for some color science.

Spot colors may include premixed inks for use instead of or in addition to process color inks. In many print environments, each spot color ink typically uses its own printing plate on a print press. Spot colors can be used instead of or in addition to process colors for better color accuracy, better color consistency, and colors outside of process ink gamut and for technologies which are prone to specific printing errors. A common spot color system is PANTONE (http://www.pantone.com/). The PANTONE system defines several hundred different inks.

Process colors can be printed using a combination of four standard process inks: Cyan, Magenta, Yellow and Black (CMYK), and sometimes more than four inks are used, e.g., adding orange (O), violet (V), and green (G). Considering that every color used in some printing presses uses its own plate, it is highly impractical to print using every color in a design. Process color printing was developed, in part, to address this impracticality, since most colors can be accurately approximated with a combination of these four process colors, CMYK (or seven if using OVG). To create a process color which includes multiple inks, overprinting can be used.

Similar to CMYK, it is usually possible to print a percentage of a given spot color. We refer to printing less than 100% of a spot color as "screening" (or "a screen") the spot color or as a "spot color tint". There are sometimes advantages to using process color equivalent tint. The process color equivalent tint can be a combination of CMYK percentages which produce an approximation color for an original spot color or spot color tint. Process colors can be printed with, e.g., half tone dots.

Overprinting is the process of printing one or more colors on top of another in the reproduction of a design. Because of physical differences between inks and substrate, the result of printing directly onto the substrate versus onto another ink may differ and can be considered in a print run. In some situations, it is necessary to print the desired color using a single ink or a spot color.

Various materials and techniques can be used in the printing process which can be considered for data hiding for spot colors and process colors, these materials include: substrate, process colors, overprinting, spot colors, spot tint (screening) and process equivalent tints. In printing, the term "substrate" refers to a base material which a design is printed onto. Most often, a substrate comprises paper which can be a variety of weights and finishes. Other common substrates in commercial printing include films, plastics, laminated plastics and foils.

Some additional color science background along with our improvements and additions are provided, below.

The color of an object is often the result of an interaction between a light source, an object and a detector (e.g., the human visual system). Other detectors include point of sale captured systems, mobile phone cameras, barcode readers, etc.

Light is radiation which can be seen, in the wavelength range of about 380 to 780 nm.

Spectral reflectance can be used to describe how an object interacts with light. When reflected light is detected and interpreted through the human visual system it results in an object having a particular color. The most common way to capture spectral data with a device is by using a spectrophotometer.

FIG. 1A shows spectral reflectance of PANTONE process color inks as measured using an i1Pro spectrophotometer, from X-Rite Corporation, headquartered in Grand Rapids, Mich., USA. FIG. 1A also shows spectrum emitted by red LED illumination at or around 660 nm. FIG. 1B shows 931 CIE 2° standard observer matching functions used for converting spectral reflectance to CIE XYZ color space.

Often color is described by artists and designers in terms of mixing paint or inks. An artist often starts with white paper, which reflects most of the light. Different colored pigments are applied on top of the paper, which reduce the amount of light reflected back. Current trends for printing describe subtractive four color mixing using process color combinations of CMYK. Yellow, for instance, reflects most of the light, it absorbs only the lower wavelengths.

In 1931, the CIE (Commission Internationale de l'Eclairage) developed a way to link between wavelengths in the visible spectrum and colors which are perceived by the human visual system. The models which the CIE developed made it possible to transform color information between physical responses to reflectance in color inks, illuminated displays, and capture devices such as digital cameras into a perceptually (nearly) uniform color space. The CIE XYZ color space was derived by multiplying the color matching functions† with the spectral power of the illuminant and the reflectance of an object, which results in a set of XYZ tristimulus values for a given sample. Within the CIE model, CIE Y describes the luminance or perceived brightness. While the CIE X and CIE Z plane contain the chromaticities, which describes the color regardless of luminance.

Chromaticity can be described by two parameters, hue and colorfulness. Hue or hue angle, describes the perceived color name, such as: red, green, yellow and blue. Colorfulness is the attribute which describes a color as having more or less of its hue. A color with 0 colorfulness would be neutral. The CIE took the CIE XYZ space to propose a pseudo-uniform color space, where calculated differences are proportional to perceptual differences between two color stimuli, formally referred to as the CIE 1976 L* a* b* (CIELAB) color space. The L* coordinate represents the perceived lightness, an L* value of 0 indicates black and a value of 100 indicates white. The CIE a* coordinate position goes between "redness" (positive) and "greenness" (negative), while the CIE b* goes between "yellowness" (positive) and "blueness" (negative).

To describe how perceptually similar two colors are, the CIE developed a color difference model or color error, CIE $\Delta E_{76}$. The first model developed was simply the Euclidean distance in CIELAB between two color samples. Since then, other more complex models have been developed to address some of the non-uniformity within the CIELAB Colorspace, most notably the sensitivity to neutral or near neutral colors.

The CIELAB color difference metric is appropriate for measuring the color difference of a large uniform color region, however, the model does not consider the spatial-color sensitivity of the human eye. The luminance and chrominance CSF (Contrast Sensitivity Function) of the human visual system has been measured for various retinal illumination levels. The luminance CSF variation was measured by van Nes and Bouman (1967) and the chrominance CSF variation by van der Horst and Bouman (1969) and the curves are plotted in FIG. 1A and FIG. 1B for a single typical illumination level.

Ink overprint models predict final color obtained by overprinting several inks on a specific press and substrate. These models can be used by a digital watermark embedding algorithm to predict (1) color of the overprint for visibility evaluation, and (2) color of the overprint as seen by the imaging device for signal robustness evaluation.

Ink overprint models can be obtained in practice by combining two factors (1) set of measured color patches printed on a real press, and (2) mathematical model interpolating the measured values while making some simplifying assumptions. One model can be obtained by measuring a set of color patches obtained by sampling the space of all possible ink combinations, possibly printed multiple times and averaged. For example, for k inks and n steps of each ink, $n^k$ color patches would have to be printed and measured.

This process, known as press profiling or press fingerprinting, can be used with process inks, where a few thousand patches are used to characterize the press. Measured values are then interpolated and assembled into k-dimensional look-up table which is further consumed by software tools. ICC profiles are standardized and industry-accepted form of such look-up tables converting k ink percentages into either CIE XYZ or CIELAB space. For process inks, 4-channel CMYK profiles are standardized to maintain consistency between different printers. For example, the GRACoL ("General Requirements for Applications in Commercial Offset Lithography") specification includes CMYK ICC profiles recommended for commercial offset lithography.

One aspect of the disclosure is a method comprising: receiving a digital design comprising an encoded signal carrying a plural-bit identifier, the design including an area of layered colors; a blend module for generating reflectance spectra estimates for the digital design including the area of layered colors, the reflectance spectra estimates provided on a per pixel basis for the design; generating a grayscale image representation of the encoded digital design from the reflectance spectra estimates at or around 660 nm; transforming the grayscale image representation according to an object form factor, said transforming yielding a transformed grayscale image; generating a representation of encoded signal detectability from the transformed grayscale image; producing a visibility map of a color image representation of the encoded digital design generated from a weighted sum of reflectance spectra estimates on a per pixel basis; and providing the representation of encoded signal detectability and the visibility map to influence signal encoding.

Another aspect of the disclosure is a system comprising: an input to receive an encoded design file, the design file comprising an encoded signal carrying a plural-bit identifier, the design file comprising a design including an area of layered colors; a blend module for operating on the encoded design file, the blend module generating reflectance spectra estimates for the design, the reflectance spectra estimates provided on a per pixel basis for the design; an image warping module for transforming a color image representation generated from a weighted sum of the reflectance spectra estimates, the image warping module transforming the design according to an object form factor; a signal strength module for producing a representation of encoded signal detectability, the signal strength module operating on a grayscale image representation generated from the reflectance spectra estimates at or around 660 nm; and a visibility module for generating a visibility map of color image representation generated from a weighted sum of the reflectance spectra estimates.

The above modules can be implemented as software modules for executing on one or more multi-core processors. In another implementation, the modules are provided as dedicated circuitry, e.g., as discussed in section III. Operating Environments, below.

Further combinations, aspects, features and description will become even more apparent with reference to the following detailed description and accompanying drawings. (Color drawings corresponding to the below FIG. 1A-FIG. 3 can be found in the patent file of our U.S. Pat. No. 9,380,186, which is hereby incorporated herein by reference in its entirety.)

BRIEF DESCRIPTION OF THE DRAWINGS

FIG. 1A is a diagram showing spectral reflectance of various PANTONE process inks as measured using an X-Rite ilPro spectrophotometer. It also shows spectrum emitted by red LED at or around 660 nm.

FIG. 1B is a diagram showing a 1931 CIE 2° standard observer matching functions used for converting spectral reflectance to CIE XYZ color space.

FIG. 2A and FIG. 2B show various colors and their grayscale representation ("scanner sees") as seen by a POS scanner with a 660 nm red LED illumination.

FIG. 3 shows spectral sensitivity of a Red LED scanner, with an illumination peak at or around 660 nm.

FIGS. 14, 15, 16, 17A and 17B illustrate processing of package artwork to identify the six component panels, so they can be analyzed for readability.

DETAILED DESCRIPTION

Figure 4:
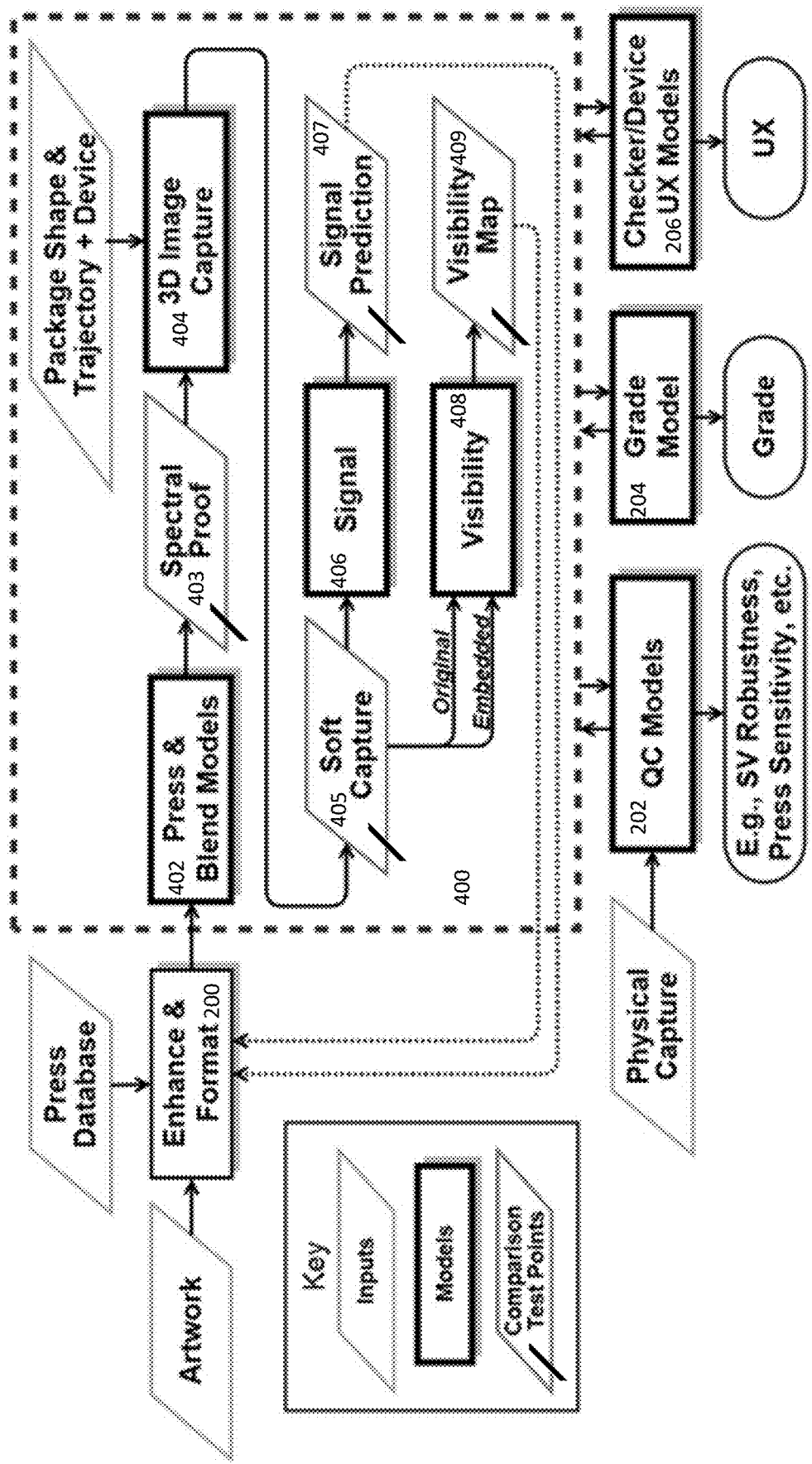
FIG. 4 is a diagram showing an image processing system.

There are three (3) main sections that follow in this Detailed Description: I. Adaptive Embedding Framework, II. Predicting Signal Strength and Visibility for Signal Encoding, and III. Operating Environments. These sections and their assigned headings are provided merely help organize the Detailed Description. Of course, description, embodiments and implementations under one such section are intended to be combined and implemented with the description, embodiments and implementations from the other such section headings. Thus, the sections and headings in this document should not be interpreted as limiting the scope of this Detailed Description.

I. Adaptive Embedding Framework

Portions of this disclosure are described in terms of, e.g., signal encoding for product packaging (sometimes just referred to herein as "packaging" or "package") and other printed objects (e.g., product labels and hang tags). These techniques can be used, e.g., to alter or transform how color inks are printed on various physical substrates and on top of other inks. The alterations or transformations preferably result in a printed design carrying machine-readable indicia. Such signal encoding techniques may beneficially interrelate with the adaptive embedding framework below.

1. Design of Human Visual System (HVS) models: A human visual system model is used to indicate the extent to which changes to an image will be visible. While a watermark signal may be designed so that it is less noticeable by constructing the signal with less noticeable colors or spatial structure, the more sophisticated model analyzes the change in visibility relative to the host signal. Thus, a signal encoding process (e.g., a digital watermark embedding process) should consider the extent to which the changes made to an existing image are visible. The host image may have little or no variation, or even no color content, in which case the visibility model assesses visibility of the signal itself and produces output providing a measure of visibility. A signal embedder (or encoder) function adapts the signal amplitude, color and spatial structure to achieve a visibility target which depends on the application. For example, a fashion magazine would have a lower visibility target than packaged goods. The host image may have regions of color tones, in which case, the embedder considers color errors introduced by the embedding process in those regions. In many cases, a host image includes regions with different color and spatial attributes, some uniform, others variable. In areas of the host image with variability, the changes due to embedding should be adapted to take into account not only visibility of an encoded signal, but in particular, visibility relative to the host signal, and its masking of changes due to the signal encoding.

a. Signal Design: In some implementations, the signal is designed to be minimally visible within the types of host image content in which it will be embedded. This design includes selecting attributes like spatial frequency content and pseudorandom spatial patterns that tend to be less visible. Some examples of such implementations are described in U.S. Pat. No. 6,614,914, which is hereby incorporated by reference in its entirety. The signal need not have random properties, however. It may have a regular or repeated pattern structure that facilitates robust detection and reliable data extraction as detailed in our published application US 2016-0217547 A1, entitled Differential Modulation for Robust Signaling and Synchronization, which is hereby incorporated by reference in its entirety. The signal design also preferably leverages encoding in color channels to optimize embedding for visibility and robustness as described in US Published Application US 2010-0150434 A1 and US 2015-0156369 A1, which are each also incorporated by reference in its entirety.

b. Human Visual System (HVS) models for signal encoding: Prior work in HVS modeling provides at least a starting point for designing HVS models for encoding systems. See, in particular, Scott J. Daly, "Visible differences predictor: an algorithm for the assessment of image fidelity", Proc. SPIE 1666, Human Vision, Visual Processing, and Digital Display III, 2 (Aug. 27, 1992); doi:10.1117/12.135952, and U.S. Pat. No. 5,394,483 to Daly, entitled, Method and apparatus for determining visually perceptible differences between images, which are hereby incorporated by reference in their entirety. Daly's HVS model addresses three visual sensitivity variations, namely, as a function of light level, spatial frequency, and signal content. The HVS model has three main components: an amplitude non-linearity function in which visual sensitivity is adapted as a non-linear function of luminance, a Contrast Sensitivity Function model of the eye that describes variations in visual sensitivity as a function of spatial frequency, and a model of masking effects. The first component is an amplitude non-linearity implemented as a point process. The CSF is implemented as a filtering process. The third in the sequence of operations is a detection process. The output is a map of the probability of detecting visible differences as a function of pixel location.

Daly used the HVS in U.S. Pat. No. 5,394,483 to develop a method of hiding one image in another image. See, U.S. Pat. No. 5,905,819 to Daly, Method and apparatus for hiding one image or pattern within another, which is hereby incorporated by reference in its entirety. Another HVS is described in U.S. Pat. No. 7,783,130 to Watson (also published as US Application Publication US 2006-0165311 A1), entitled Spatial Standard Observer, which is hereby incorporated by reference in its entirety.

In our prior work, we developed a perceptual masking model for encoding signals that incorporates a CSF of the eye as well as a method for directional edge analysis to control perceptibility of changes due to watermark embedding around directional edges in a host signal. See U.S. Pat. No. 6,631,198, which is hereby incorporated by reference in its entirety.

We found that the Daly and Watson methods were useful but further work was needed for our encoding techniques in color channels. Therefore, we developed HVS methods that incorporate color visibility models.

Our U.S. Pat. No. 9,449,357 describes a full color visibility model for watermarking in color channels. U.S. Pat. No. 9,449,357, entitled Geometric Enumerated Watermark Embedding for Spot Colors, is hereby incorporated by reference in its entirety. One particular usage is encoding in color channels corresponding to color inks used to print a host image. The signal modulations of color values are modeled in terms of CIE Lab values, where Lab is a uniform perceptual color space where a unit difference in any color direction corresponds to an equal perceptual difference. The Lab axes are scaled for the spatial frequency of the watermark being encoded into the image, in a similar manner to the Spatial CieLab model. See, X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif., USA, June 1996, which is hereby incorporated by reference in its entirety.

This scaling provides a uniform perceptual color space, where a unit difference in any color direction corresponds to an equal perceptual difference due to the change made to encode a signal at that spatial frequency. The allowable visibility magnitude is scaled by spatial masking of the cover image. This masking is computed based on a masking function. Examples of masking functions include the masking components of the Spatial Standard Observer model of Watson or the HVS models of Daly referenced above, as well as our prior patents, such as U.S. Pat. Nos. 6,631,198 and 6,614,914, referenced above.

Relatedly, our U.S. Pat. No. 9,565,335, describes techniques for embedding watermarks in color channels that employ full color visibility models. U.S. Pat. No. 9,565,335, entitled Full-Color Visibility Model Using CSF Which Varies Spatially with Local Luminance, is hereby incorporated by reference in its entirety. This approach uses a full color visibility model for watermarking in color channels. This visibility model uses separate CSFs for contrast variations in luminance and chrominance (red-green and blue-yellow) channels. The width of the CSF in each channel is varied spatially depending on the luminance of the local image content. The CSF is adjusted so that more blurring occurs as the luminance of the local region decreases. The difference between the contrast of the blurred original and marked image is measured using a color difference metric.

The luminance content of the host image provides potential masking of changes due to watermarking in chrominance as well as luminance. Likewise, the chrominance content of the host image provides potential masking of changes due to watermarking in luminance as well as luminance. In our watermarking systems that embed by changes in luminance and chrominance, or just chrominance, of the host image, the embedding function exploits the masking potential of luminance and chrominance content of the host image. The masking potential at a given region in an image depends in part on the extent to which the host image includes content at that region that masks the watermark change. For example, where the watermark signal comprises mostly high frequency components, the masking potential of the host image is greater at regions with high frequency content. We observe that most high frequency content in a host image is in the luminance channel. Thus, the luminance content of the host is the dominant contributor to masking potential for luminance changes and chrominance changes for high frequency components of the watermark signal.

In some applications, the watermark signal has lower spatial frequency content, and the embedding function computes the masking capability of that low frequency content on the watermark signal as well, taking into account both luminance and chrominance masking on luminance and chrominance components of the watermark signal.

Our encoding techniques in luminance and chrominance channels also leverage masking of spatial structure particular to those channels. Such visibility effects originate both from the host image as well as the print technology. The host image content can have strong spatial frequencies at an angle, which masks similar spatial structure of the watermark at that angle. Likewise directional edges in the host image control watermarking along the edge as noted in U.S. Pat. No. 6,631,198.

The print technology sometimes prints with halftone screen or raster for different inks with different orientation, shape, and structure. Black inks, for example, are sometimes printed with halftone dots at screen angle of 45 degrees to achieve a higher print quality because black is most noticeable to the eye and it is desirable to make the spatial pattern of black dots less noticeable. These types of print structures for different color inks provide an opportunity to hide the watermark signal differently in the color channel or channels that correspond to that ink. For more on watermarking that exploits the halftone structure and Raster Image Processor used in printing, please see our US Patent Publication US 2014-0119593 A1, which is hereby incorporated by reference in its entirety.

2. Robustness modeling: Optimizing the embedding for robustness adds another constraint in which the encoding is controlled not only to achieve a desired visual quality, but also to achieve reliability in decoding a signal. A simple view of robustness may be to set a floor on the gain or signal level of the watermark signal, but this is potentially less useful if it does not consider how well watermark signal structure is maintained within a host image, or opportunities to apply less gain where signal structure is maintained due to attributes of the host image that are inherently better at carrying data with less or no modification. A more sophisticated view is to consider how the watermark signal conveys data through its color and structure or the color and structure created when it exploits host signal structure to mask watermark variations and/or carry data (e.g., where signal data is encoded in the relationship among values or an attribute derived from a region in an image, how is that relationship or attribute impacted by modifications made to reduce visibility?) Thus, controlling the strength of the watermark signal should also ensure that such control does not undermine its reliability. A robustness metric can be designed based on readability of the watermark, e.g., through a detection metric: modification of the signal to remain within a visibility constraint should maintain the structure of the signal that conveys digital data. U.S. Pat. No. 9,449,357 describes a framework for watermark embedding that optimizes embedding based on visibility and robustness models.

3. Modeling the distortion of the channel: Related to robustness optimization, the embedding process should take into account the impact of anticipated distortion introduced by printing, use or scanning of the printed object. A particular concern is the extent to which a change to embed an image will become more visible due to the technology used to render the image, such as the display or printer. This type of rendering distortion may be incorporated into the model to predict the change in visibility and/or robustness after distortion, and adjust the embedding to compensate for this change. Likewise, the rendering distortion may also impact robustness. As such, robustness modeling should account for it as well.

See in particular, our U.S. Pat. No. 7,352,878, which describes a model that incorporates a model of the rendering device (e.g., display or printer) within an adaptive embedding function. The embedder uses this model to adapt the visibility mask used to control the watermark signal, so that it takes into account the effects of the rendering device on visibility. U.S. Pat. No. 7,352,878 is hereby incorporated by reference in its entirety. These techniques may be further combined with full color visibility models and robustness models referenced in this document.

Other examples of modeling distortion include adding noise, applying a geometric distortion, compressing the image, and modeling image capture distortion. For package images to be printed on a 3D object with known shape, the geometric distortion applied to the image is known and its effect can be compensated for in the embedding of the watermark in the package design. Examples include labels wrapped around a curved object (e.g., a yogurt cup or soup can). The watermark signal (and in some cases the host signal itself) may be pre-distorted to compensate for the geometric transformation caused by application of it to the object. This and other noise sources may be modeled and applied to the watermarked image to measure its reliability in the robustness model. The watermarking process is then corrected or iterated as necessary to achieve reliable detection metrics.

4. Printing technology limitations: Another related constraint is the limitation of the print technology. As noted, it may cause distortion that impacts visibility and robustness. It may have limitations in the manner in which it is able to represent a color or spatial structure of the watermark signal. It may not be able to print a particular color, dot structure, orientation or size/resolution, or may introduce registration errors among different ink layers that make encoding in color directions not viable. Distortion due to dot gain and other limitations of replicating an image on a substrate need to be accounted for. Dot gain distortion can be modeled in the robustness model such that the watermark signal is embedded to be robust to the distortion.

5. Image capture device limitations: Another design consideration is the image capture device. Some forms of image capture devices, such as barcode scanners, do not capture full color images. For example, some barcode scanners have monochrome image sensors and illuminate an object with red LED illumination. This type of limitation requires that the watermark signal be designed so that it can be "seen" by the capture device, meaning that at least a portion of the watermark signal is readable in the spectral band or bands captured by the image sensor. We discuss these limitations and methods for addressing them in our US Application Publication US 2013-0329006 A1 and U.S. Pat. No. 9,380,186, which are hereby incorporated by reference in their entirety.

6. Color Appearance and Attention Models: Attention (also referred to as "saliency") models may also be included to adjust visibility model for controlling watermark modification at a particular location within an image. See our U.S. Pat. No. 9,565,335 for description of how to use this type of model in a watermark embedder. An attention model generally predicts where the human eye is drawn to when viewing an image. For example, the eye may seek out flesh tone colors and sharp contrast areas. One example attention model is described in Itti et al., "A Model of Saliency-Based Visual Attention for Rapid Scene Analysis," IEEE TRANSACTIONS ON PATTERN ANALYSIS AND MACHINE INTELLIGENCE, VOL. 20, NO. 11, NOVEMBER 1998, pgs. 1254-1259, which is hereby incorporated herein by reference in its entirety. High visual traffic areas identified by the attention model, which would otherwise be embedded with a relatively strong or equal watermark signal, can be avoided or minimized by a digital watermark embedder, e.g., through adjustment of the visibility map used to control application of the watermark signal to a host image. In many application scenarios, it is advantageous for the embedding system to take into account a Color Appearance Model (CAM) to assess the extent to which a change in color is likely to be noticeable relative to colors present in the host image. For information on CAM, please see Fairchild, Mark D. Color Appearance Models. Chichester: John Wiley & Sons, 2013. Our application of digital watermarking in packaging provides methods in which CAM is automated and applied in embedding functions for advantageous effect.

Package designs typically include colors for which the package designer attaches importance over other colors. For example, a consumer product brand may have a color or combination of colors that are strongly associated with the brand. The designer, thus, seeks to achieve consistency and accuracy in representing this color across all of its packages. This may be achieved through the use of a spot color. Another example is where the designer selects a particular color or color combination to evoke a particular theme for the product (e.g., a pineapple flavored product might use a yellow color). This color might be modified by the watermark, but the modification should not undermine the intent of the designer, nor appear objectionable to the consumer. Finally, the remaining colors on package may be less important, and thus, more available for modification. Among these parts of the package design, there may be regions in which a tint may be applied to convey the digital watermark or the host image may be modulated in a particular color or set of colors. Overall, none of the image should be modified in a manner that undermines the designer's objective for the dominant brand colors, or an important thematic color.

To illustrate, consider an implementation of adaptive watermark embedding in a plug in of a design program used for designing the package image. The plug in allows the designer to specify importance of colors, which in turn, dictates whether the plug in will modify a color, and if so, the extent to which the modification are allowed to deviate from the original color. For the colors in a design, the CAM takes their priority and provides constraints for color modifications that are applied in the embedding function. The color match error for use of a substitute color for an original color (e.g., process inks for spot color) and the color error introduced by the watermark are weighted according to the priority of the color. Additionally, the CAM places a constraint on the direction in color space of the modification to a particular color. The following examples will illustrate.

If a bright background area is available for conveying a data signal, the CAM detects the bright area by their pixel values and provides specification for the tint used to fill that area that satisfies the CAM constraint relative to the color of other features in the design. This bright background is intended to look white or nearly white and a light tint added to it will not be noticeable so long as it is uniform in the design and not modulated in a color direction that is incompatible with the color of neighboring features. So long as the area covered by the tint remains substantially brighter than the rest of the design elements, it will not be noticeable. It would only be noticeable if it were positioned next to a blank area with no tint. The CAM constraints preclude noticeable changes of appearance of regions and can also be set so that the modulation of such areas are smoothly tapered near regions with other colors of higher importance.

Another example is a package design where there is a thematic color for which the CAM limits the direction of color modulation or alternatively specifies a black tint to convey the watermark signal. The example of the yellow for a pineapple product is appropriate to illustrate. For such a case, the CAM takes the priority weighting for the yellow and further constrains the modulation color direction to preclude objectionable color changes within the yellow region of the package. Green is an example of a color that would be incompatible and thus precluded by the constraint set by the CAM for the yellow region of the design. Alternatively, the embedder substitutes a black ink tint if a robustness measure indicates that a reliable signal cannot be achieved in allowable chrominance modulation directions or channels.

II. Predicting Signal Strength and Visibility for Signal Encoding

One problem with auxiliary signals encoded within product packages and other physical objects (e.g., product hang tags) is obtaining encoding visibility that is subjectively pleasing to a graphic designer and others, yet remains robustness enough to allow for reliable detection. For example, a graphic designer may be hesitant to introduce too much "noise" into a product's design. The term "noise" refers to visible artifacts in a spatial domain that may be created when the design is transformed to carry an encoded signal. These artifacts may sometimes have a noise-like, grainy or other visible appearance. In other cases, e.g., using our sparse mark technology as described in US 2016-0275639 A1 and US 2017-0024840 A1, which are each herein incorporated herein by reference, where there is no or little interfering host content the signal is less noise-like, but may still occasionally introduce visible artifacts. As a result, the designer may crank down encoding signal strength (or signal "gain") or remove the encoding from some design areas altogether. This may result in a loss of signal robustness. We use the terms "signal robustness" to mean a measure of encoded signal detectability. For example, in a low signal robustness case, embedded signals carried in the product package or print object may not be detectable in some or all areas of the package surface. We sometimes refer to such a package or printed object as a low-gain design. (A low-gain design may include areas without signal encoding, and/or areas with low-signal gain, perhaps along with some design areas that are robustly embedded.)

Now imagine such a low-gain design in a retail checkout scenario. For example, please see assignee's U.S. Pat. No. 9,224,184, which is hereby incorporated herein by reference in its entirety. In this setting, packages or other encoded objects move along at retail checkout, e.g., on a conveyor or with employee-assist. A signal detector analyzing image data representing a low-gain design may not be able to detect encoded signals from the image data. A non-detect may result in a slowed check-out process, requiring human intervention or other processes to enter the product's identification (ID) code (e.g., a GTIN or UPC).

Low-gain designs need to be discovered prior to press runs. For example, tens of thousands of packages or objects can be printed (e.g., on offset, flexo or digital printing presses) before it's realized that an encoded design is a low-gain type. At the printing press stage, it is often too late to "stop the presses" to create new printing plates and roll out a new design, one having a higher encoded signal strength.

Aspects of this disclosure address these types of problems by, for example, predicting embedding strength, detectability and/or visibility across a printed product package or object from an encoded digital design itself. This prediction may consider many factors including press and blend models, signal strength predictions, visibility predictions, object geometry, etc. Moreover, the prediction may allow for a quality assurance check, a product grade and or a prediction associated with user experience. Additionally, the prediction can be associated with a particular spectral wavelength.

For example, Point of Sale (POS) scanners with red LEDs typically include a narrow-band monochromatic imager with a peak response at or around 660 nm. We use the terms "at or around 660 nm" to mean a peak or maximum illumination within a range of 630 nm-710 nm. One example is a peak at 660 nm. Another example is a peak at 688 nm. Still another is a peak at 645 nm or 658. Of course, many other peaks are intended to be included within this "at or around 660 nm" range. Such red LED scanners are often found at grocery checkout lanes, as they operate to find and decode traditional 1D or 2D barcodes. See FIG. 3 for a spectral response of a typical red LED capture device; see also FIG. 1A. A red LED capture device (e.g., a point of sale scanner or camera) only "sees" colors which reflect at or around 660 nm. If a color strongly reflects at this wavelength the captured device 'sees' white. Bright yellows, magenta, pink, orange and white are all 'seen' as white by a red LED capture device. See FIG. 2B. If a color has a low reflection at this wavelength (e.g., absorbs the wavelength) the captured device "sees" black. Dark blue, Cyan, green, purple and black are all 'seen' as black by the camera. See FIG. 2A. Changes made to colors of low spectral reflectance at or around 660 nm are visible (that is, e.g., they register as black pixel values) to the scanner and may be suitable for carrying information signals. Due to the combination of a narrow-band illumination and monochromatic sensors, a typical barcode scanner can only see grayscale images created by spectral changes in ink reflectance at or around 660 nm. (We recognize that high reflectance holes or openings, relative to a darker background, can be patterned to convey an encoded signal. See, e.g., our US Published Patent Application No. US 2016-0275639 A1, which is hereby incorporated herein by reference.)

An encoded signal prediction system 400 and related methods and sub-systems are discussed with reference to FIG. 4. This system 400 includes various technology modules including a Blend & Press (or "BLESS") module 402, 3D Image Capture module 404, Signal module 406, and Visibility Module 408. We use the term "module" to represent particular technology, which can be realized in various ways. One implementation is a Digital Signal Processor (DSP) programmed or formed to execute such technology. Another is a programmed Graphics Processing Unit (GPU). Yet another implementation is an application specific integrated circuit (ASIC), including custom circuitry to carry out the technology. Still another is software code which is used to program one or more electronic processors, one or more processor cores, e.g., each handling different threads, and/or one or more parallel processors. Other implementations are discussed below with reference to FIG. 6.

The signal prediction system 400 receives an encoded image or image file as an input. The image file may be a design for a retail package or other artwork A package design file or object file design (e.g., referred to as "Artwork") is processed by a signal encoder 200, which encodes a signal into the artwork. In some alternative embodiments, signal encoder 200 is included within system 400. The design file may include, e.g., artwork, graphics, text, designs, images, e.g., in one or more layers, channels, or combinations. The design file format may include one or more PDF files (universal format), Adobe Illustrator (vector format) or Photoshop files (raster format), etc. The signal encoder 200 transforms the file design or Artwork to carry an encoded signal, thereby enhancing the design file or Artwork to include an encoded signal therein. The transformation may involve, e.g., digital watermarking or other signal encoding. Digital watermarking may introduce CMY (K) color channel modifications to carry a signal, modify spot colors to carry encoded signals, combine colors to convey a signal, substitute colors, and/or modify colors along various axes (e.g., Lab), etc., all to encode an auxiliary signal within the design file. See, e.g., assignee's U.S. Pat. Nos. 9,380,186, 9,582,844, 9,635,378 9,667,829, 9,747,656 and 6,614,914, and see assignee's US Published Patent Application No. 2017-0024840 A1, which are each hereby incorporated herein by reference in its entirety. Signal encoder 200 may transform, convert or require a particular file format, e.g., vector or raster format. We current prefer a raster formatted file.

An encoded signal may carry or convey a plural-bit payload, e.g., a GTIN or other identifier. Items in stores are typically assigned an identification number in a numbering scheme managed by GS1 called a Global Trade Identification Number (GTIN). The GTIN plays a vital role within store operations as it identifies products and acts as a database key to associate the product with product attributes including its name and price. For many products, the GTIN is assigned by the manufacturer of the item and encoded in the packaging, via a UPC Symbol. We prefer a signal encoding scheme that provides redundant encoding on a package or printed object, including on multiple package sides, or on a printed object like a hang tag. In one implementation, digital watermarking may provide redundant encoding so as to replicate a GTIN or other identifier in two-dimensional tiles across a file design. In other signal encoding, redundant encoding is provided so as to replicate a GTIN or other identifier in multiple different package locations.

Signal encoder 200 may also receive press information associated with a target printing press. For example, a given press or press family model may be known to have a printing tolerance that varies from accepted standards. The signal encoding may be adjusted, e.g., by increasing or decreasing encoding signal gain, to accommodate such variances. In other implementations, the type of encoding itself varies depending on press information. For example, CMY modulation may be selected for a first press, while a single channel sparse mark may be selected for a second press.

System 400 receives an encoded file design as an input. The encoded file is presented to BLESS module 402. The BLESS module 402 receives as input an image or image data and generates a spectral proof or spectral data that represents the image or image data as printed, e.g., by a particular press for a given substrate. In some implementations the BLESS module 402 operates to, e.g., predict spectral reflectance of ink overprints on various substrates, as printed using common printing technologies (e.g., offset, flexo, etc.). For example, an image or image data may have one or more areas where a spot color is overprinted by CMY(K) inks. The original inks at pixel or print locations may have been modified to carry an encoded signal. A spectral reflectance prediction can be made for the encoded and original overprinted areas (and areas including zero or only one ink). Full spectrum (as opposed to just CIEXYZ/Lab) is preferred to support accurate signal representation across the spectrum. For example, a final printed design may have different—if not competing—goals. The printed design is preferably robust, e.g., not a low-signal gain. So, if an anticipated signal detector (e.g., a digital watermark detector) has a peak illumination at or around 660 nm (or evaluates imagery captured using such illumination), the spectral reflectance in this narrow-band is helpful to determine whether a scanner will "see" the encoded signal. Additionally, the ascetics of the final printed package can be evaluated relative to a Human Visual System (HVS) model to determine whether the print will be acceptable for designers and customers. A HVS evaluation may utilize predicted spectral reflectance for wavelengths perceptible to humans (e.g., a range including 390 nm to 700 nm), whereas the red LED signal detector would utilized predicted reflectance at or around 660 nm.

Figure 5A:
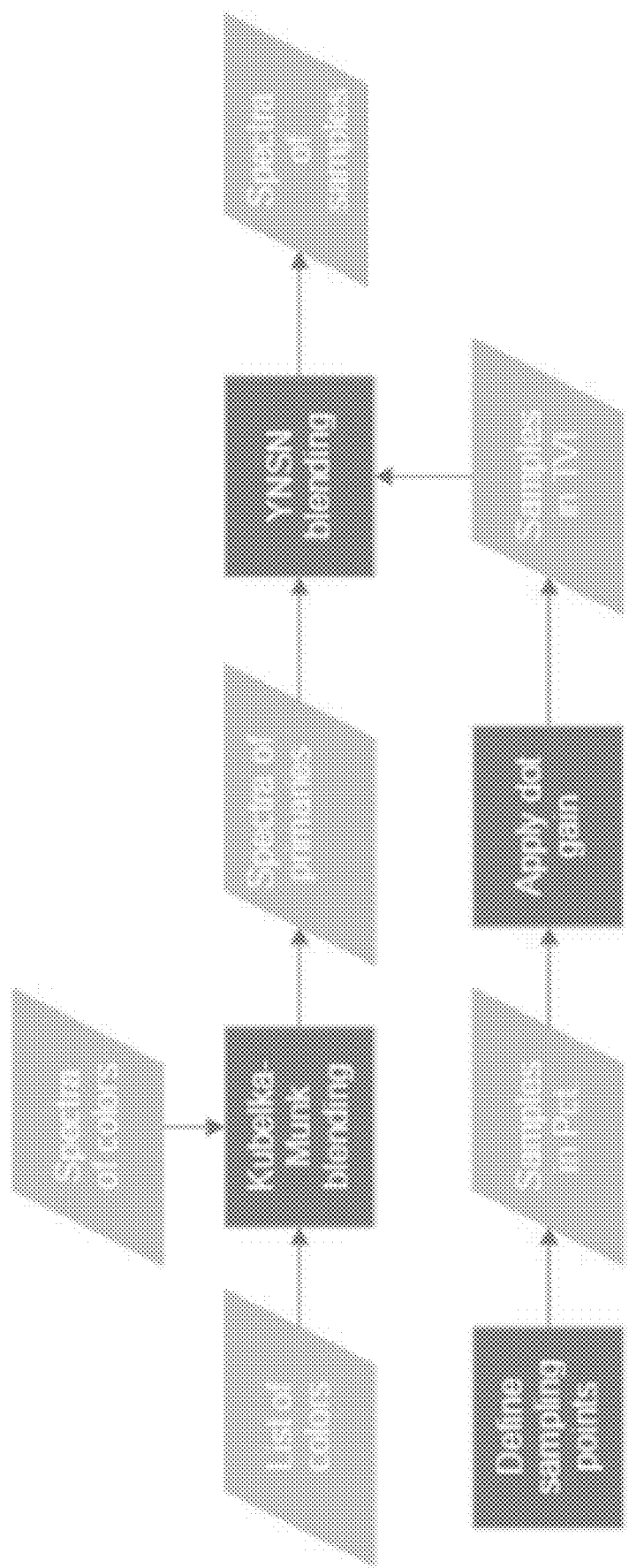
FIGS. 5A and 5B are diagrams showing additional details of the Press & Blend Models module from FIG. 4.
Figure 5B:
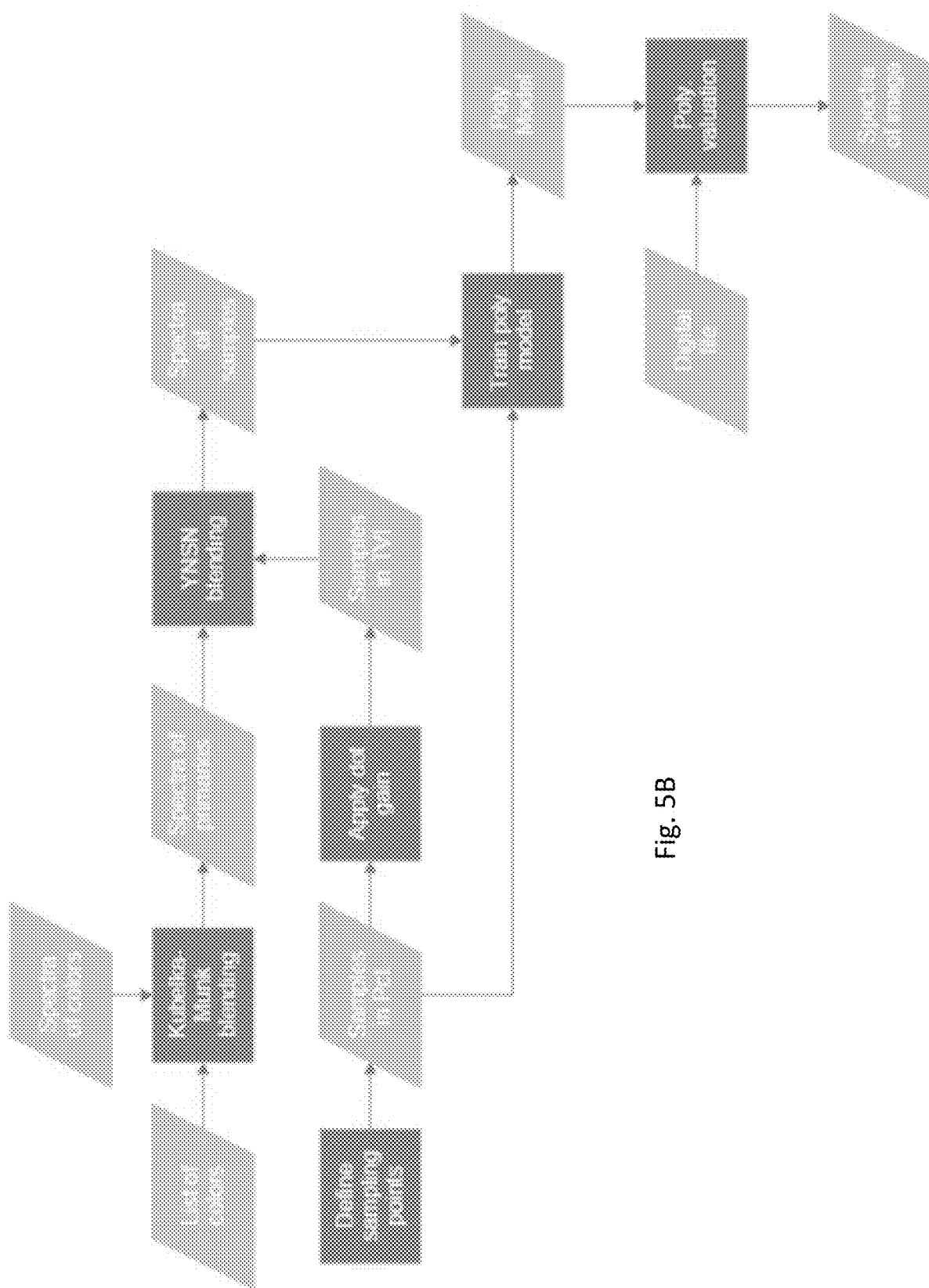

One embodiment of a BLESS Module 402 is described further with reference to FIGS. 5A and 5B. BLESS Module 402 operates to predict or model how various print colors will interact or "blend" with one another, e.g., when printed over one another (e.g., "overprint" or "layered") and/or printed on various different types of substrates, in connection with encoded signals. A significant number of retail packages in commerce are printed to include at least some areas using "spot colors" and/or some "process colors". More generally, BLESS Module 402 predicts or estimates spectra reflectance characteristics of an overprint of inks, e.g., superimposed or layered process color inks and/or spot colors, on various different substrates. Because of physical differences between inks and substrates, a result of printing directly onto the substrate versus printing onto another ink may differ and can be considered for an encoded design file.

As a refresher, so-called spot colors may include premixed inks for use instead of or in addition to process color inks. In many print environments, each spot color ink typically uses its own printing plate on a print press. Spot colors can be used instead of or in addition to process colors for consistent color accuracy, color consistency, and colors outside of process ink gamut and for technologies which are prone to specific printing errors. A common spot color system is PANTONE (http://www.pantone.com/). The PANTONE system defines several hundred different colors/inks.

Standard process inks generally include cyan (C), magenta (M), yellow (Y), and black (K). Sometimes more than four inks are used, e.g., orange (O), violet (V), and green (G). Considering that every color used in some printing presses uses its own printing plate, it is highly impractical to print using every color in a design. Process color printing was developed, in part, to address this impracticality, since most colors can be accurately approximated with a combination of four process colors, CMYK, and optionally, OVG. To create a process color which includes multiple inks, overprinting can be used.

But let's get back to blending inks in connection with BLESS Module 402. It can be important to accurately predict or model how various print colors will interact or "blend" with one another, e.g., when overprinted onto one another on various different types of substrates. An inaccurate prediction at the design stage can result in a design that is subpar in terms of poor encoded signal robustness (e.g., low encoded signal detection) and high signal visibility. That is, a poor ink blend prediction can result in an aesthetically ugly design that doesn't detect very well.

The colors included in an encoded design file and corresponding spectra information associated with the design file colors are presented to an overprint prediction module, e.g., a Kubelka-Munk model ("K-M"). The Kubelka-Munk color model provides a description of reflectance for opaque samples. The model considers, e.g., the absorption and scattering occurring in a colored sample of fixed thickness, and can be applied on a wavelength by wavelength basis throughout the visible region of the electromagnetic spectrum. The original K-M paper was published as Kubelka, P. and Monk, F., Z tech. Physik, 12, 493 (1931), and is summarized in hunterlab. (2008). The Kubelka-Munk theory and K/S, insight on color. Application Note, Vol 18, 7. (http://www.hunterlab.com/appnotes/an07_06.pdf), which are all hereby incorporated herein by reference in their entirety. And summarized as follows: For samples with opacities greater than 75%, the K-M equation defines a relationship between spectral reflectance (R in %) of the sample and its absorption (K) and scattering (S) characteristics, as follows:

$$\frac{K}{S} = \frac{[1 - 0.01\ R]^2}{2[0.01R]}.$$

For example, if spectral reflectance at a given wavelength is 55%, its K/S at that wavelength is calculates as follows:

$$\frac{K}{S} = \frac{[1 - 0.01*55]^2}{2[0.01*55]} = \frac{0.45^2}{1.1} = 0.184.$$

K/S values for the sample measured are calculated separately for each wavelength read. The K-M model further extends to mixtures of colors and that the K/S value for a mixture of colors is the sum of the K/S values of the individual colors as follows:

$$(K/S)_{mixture} = a(K/S)_{color\ 1} + b(K/S)_{color\ 2} + c(K/S)_{color\ 3} + (K/S)_{base},$$

where a, b, c, are the concentrations of the corresponding colors.

See also Dfimbeg-Malcic et al., "KUBELKA-MUNK THEORY IN DESCRIBING OPTICAL PROPERTIES OF PAPER (I)," Technical Gazette 18, 1(2011), 117-124, which is hereby incorporated herein by reference in its entirety The Kubelka-Munk model characterizes the effect of light transfer in terms of absorption, scattering and reflectance using an assumption of a one-dimensional light flux, hence isotropic scattering within the material. Under this assumption, the material layer is characterized by a wavelength dependent scatter coefficient and absorption coefficient. The model may be applied to both reflecting and transparent material.

We preferably use a K-M model to estimate resulting spectral reflectance of certain ink combinations, and in other cases, estimate the reflectance of the so-called Neugebauer Primaries ("NPs"). NPs are the collections of reflectances which include the reflectances of the primary color(s), the reflectance of a substrate and the reflectances of the possible combinations of the primary (or provided) color(s). Neugebauer's model is discussed, e.g., in Wyble et al., "A critical review of spectral models applied to binary color printing," Color Research & Application, 25(1):4-19, 2000, which is hereby incorporated herein by reference in its entirety. From Wyble, when modeling a color print, multiple colorants can be considered. Neugebauer accounted for multiple colorants by summing the product of the fractional area coverage of each colorant and its reflectance at full area coverage:

$$\hat{R}_\lambda = \sum_i F_i R_{\lambda,i,max}.$$

Here, the summation is over i, representing the eight Neugebauer primaries: bare substrate, single separations, and two- and three-color overlaps. For three-color subtractive printing, these could be white, cyan, magenta, yellow, red, green, blue, and three-color black. $R_{\lambda,I,max}$ are the spectral reflectance values of each ith primary at full colorant coverage, and $F_i$ are the fractional area coverages of each respective colorant. When treated simply as a mathematical analysis, the Neugebauer model reduces to performing trilinear interpolation across the printer reflectance space. The nodes for this interpolation are the spectral reflectances of the eight Neugebauer primaries.

Spectral reflectance of an image area can be expressed as a sum of reflectance of each combination of ink (e.g., the Neugebauer Primaries) weighted by the relative proportion of the paper it occupies. The NPs estimated by the K-M model can be used to identify the corners or boundaries of an overprint. But further refinement is preferred.

The boundary or corner outputs (NPs) of the K-M blending model are provided to a blending model, which estimates reflectance of the rest of (or subset of) the NPs for the overprints across the visible spectrum. For example, the module can estimate reflectance values for possible combinations of these NPs. A Yule-Nielsen Modified Spectral Neugebauer (YNSN) blending model can be used for this further refinement. See, e.g., J. A. C. Yule, W. J. Nielsen, "The penetration of light into paper and its effect on halftone reproductions," Proc. TAGA, Vol. 3, 65-76 (1951) and Hersch, et. al. "Improving the Yule-Nielsen modified spectral Neugebauer model by dot surface coverages depending on the ink superposition conditions," Electronic Imaging Symposium, Conf. Imaging X: Processing, Hardcopy and Applications, January 2005, SPIE Vol. 5667, 434-445, which are each incorporated herein by reference.

The Yule-Nielsen model shows that the nonlinear relationship between measured and predicted reflectance could be well described with a power function.

$$\hat{R}_\lambda^{1/n} = a_{\mathit{eff}} R_{\lambda,t}^{1/n} + (1-a_{\mathit{eff}}) R_{\lambda,s}^{1/n}$$

Or equivalently, $$\hat{R}_\lambda = [a_{\mathit{eff}} R_{\lambda,t}^{1/n} + (1-a_{\mathit{eff}}) R_{\lambda,s}^{1/n}]^n,$$

where n is a parameter accounting for light spreading in paper, where $\hat{R}_\lambda$ is predicted spectral reflectance, $a_t$ is fractional dot area of the ink (the tint), $R_{\lambda,t}$ is the spectral reflectance of the ink at full coverage, and $R_{\lambda,s}$ is the spectral reflectance of the substrate. The Yule-Nielsen model can be modified by combining with Neugebauer:

$$\hat{R}_\lambda = \left[\sum_i F_i R_{\lambda,i}^{1/n}\right]^n.$$

where fractional area coverage is $F_i$.

Sampling points (e.g., at certain wavelengths within the spectrum, e.g., along 16, 24, 32 or 64 wavelength points (e.g., 660 nm) within the visible spectrum can be considered as well, and also dot gain for a specific printing press or type of press. Dot gain information can be provided to the YNSN blending model. (The "YN" of the YNSN model incorporates dot gain effect into the Spectral Neugebauer Model (the "SN" part).) There are two primary components of dot gain: mechanical (the spreading of ink under pressure) and optical (light scatter within the substrate around the perimeter of a dot). We can report dot gain to the YNSN module in terms of Tone Value Increase (Tvi). From a measurement point of view, dot gain and Tvi are identical. We think that the term Tvi is gaining traction in the field so we include it here.

The output of the YNSN blending model yields reflectance spectra estimates for ink overprinting across the visible spectrum. These outputs are for image areas such as for a pixel, pixel area or object area. The output estimates colors, including encoded colors, coming off a press as detected by a spectrophotometer. In another implementation, the YNSN blending model yields reflectance spectra estimates for ink overprinting at a particular wavelength, e.g., at or around 660 nm, or at 660 nm. These values can be used to accurately predict visibility and robustness of an encoded signal as incorporated within artwork or imagery.

With reference to FIG. 5B, a percent-ink to reflectance value module (Poly model) can be optionally used with the BLESS module to help map percent of ink changes to reflectance changes. For example, if a design only calls for an ink printed at 50%, how does this effect a reflectance prediction? This module is applied to the encoded design file to determine ink percentages within the file. These ink percentages are used to scale or adjust the predicted spectra reflectance estimates for the encoded design file.

In an alternative embodiment, system 400 (or sub-system 402) includes an input to allow a user to choose substrate opacity from one of several default settings, e.g., 'Opaque', 'White Poly with Light Fill', 'White Poly with Medium Fill', 'Opaque White with Light Fill', 'Opaque White with Medium Fill', 'Clear with Light Fill', 'Clear with Medium Fill', etc. Predetermined spectra for these opacity's can be measured or otherwise determined and used to model an opacity selection.

Figure 7:
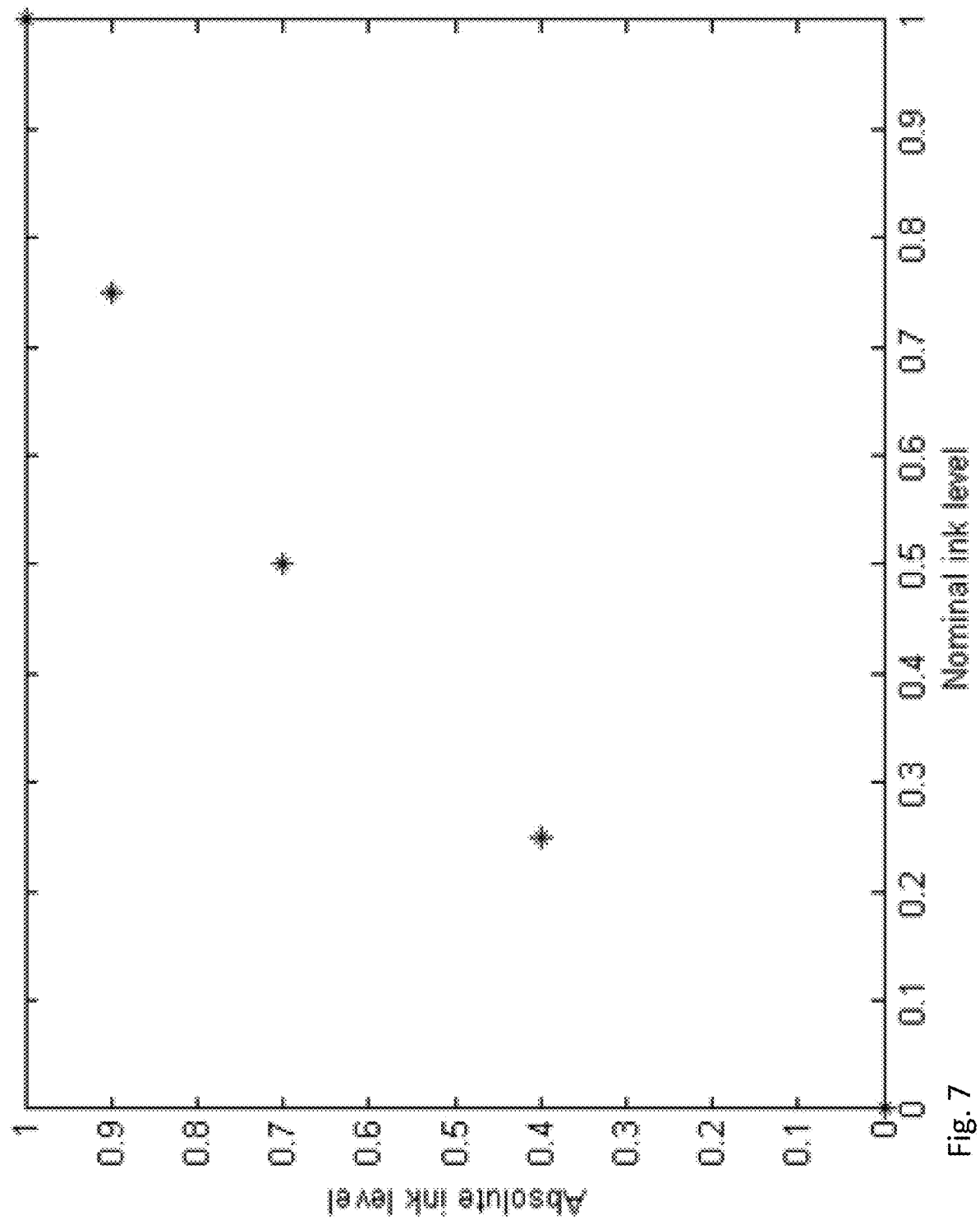
FIG. 7 is a graph diagram illustrating a relationship between a nominal ink level and an absolute ink level.

The BLESS model may also include spectral properties for many different substrates and inks including, e.g.:
Paper: gloss coated, matt coated, uncoated, textured, colored
Clear and white plastic film
Metal, (colored) glass, rigid plastic
Label paper (coated and uncoated), clear label paper, metalized label paper
CHROMOLUX® label papers and boards from M-real Zanders 1 line
Various AVERY DENNISSON label materials
Process colors
PANTONE® and PANTONE GOE colors (solids, pastels, metallic)
Spot colors and opaque spot colors
Screen printed (opaque) colors
Reverse printing, surface printing or recto-verso printing
Spot UV varnish (matt, satin, glossy)
Proprietary varnishes from Fujifilm® and Sakata INX®
Embossing and debossing, multi-level, sharp or rounded
Sculptured embossing
Die-cutting
Hot stamp metal foils (gold, silver or colored)
Cold foils (gold, silver, colored, overprinted)
Metallic inks (PANTONE® metallics, Eckart silver and gold pigments)
Kurz® Light Line holographic foils Returning to FIGS. 5A and 5B, a customer supplied TVI curve can be, e.g., a 5-element vector specifying an absolute ink level at nominal ink percentage 0%, 25%, 50%, 75%, and 100%. And the vector values should be non-decreasing. For example, a TVI vector in absolute ink level of (0, 0.4, 0.7, 0.9, 1), means the relative gains are (0%, 15%, 20%, 15% and 0%), respectively. FIG. 7 illustrates a relationship between nominal ink level and absolute ink level. And when the customer supplied TVI curve is not present, BLESS Module 402 can use a default curve to generate the TVI for spot inks. For process inks, associated ICC color profiles can be used to generate the TVI curves for each ink, and the customer supplied TVI curve will not affect process inks.

Returning to FIG. 4, the BLESS model outputs 403 spectra reflectance information for the encoded design file, e.g., on a pixel by pixel basis (or for another image area size). For each pixel, an array of estimated reflectance spectrum samples (e.g., at different wavelengths) can be stored or utilized. In different implementations, this spectra reflectance information may also have (or be limited to) a spectral dependence limitation, e.g., containing information only at or around 660 nm, instead of providing spectral reflectance information across the visible spectrum. A spectral proof can be generated from the spectral reflectance information 403. For example, a grayscale image can be produced from the spectral reflectance estimates on a per pixel basis at or around 660 nm, e.g., at 660 nm. This grayscale image comprises an estimate of what a red LED scanner would see from an image capture of a printed version of the encoded design file. Or an L*a*b* digital image version can be generated from a weighted sum of the estimated reflectance spectra samples per pixel across the estimated reflectance spectra information for the encoded design file.

System 400 includes a module 404 to adapt the encoded design file (or spectral proof) according to anticipated printed object geometry. This will help simulate the amount of encoded signal degradation introduced from wrapping due to a package form factor. For example, if the encoded design file is destined to be printed on a can of soup, the contour of a cylinder can be applied to the encoded design file. For example, the design file images can be warped to simulate a cylinder view. In one implementation, and for a cylinder, we divide an image into vertical stripes, e.g., 4 quadrants. The center areas of these quadrants are viewed as flat, e.g., they are not warped, or are only warped slightly. The outer and border areas are warped with a transformation to mimic an image capture of a curved or cylindrical surface. This yields an estimation of design file as if the encoded design file were printed and then applied to a curved (or other geometry) surface. If the encoded design file is intended for a flat sheet or for a plurality of flat sheets (e.g., 6 images for a 6-sided package), then the image data can be unaltered without warping. The output 405 of Module 404 mimics an optical capture of a printed encoded design file, on a particular surface, e.g., flat (full sheet or surface), cylindrical package (with vertical profile), or cylindrical with tapering (e.g., like a yogurt cup), etc. For a trapezoidal shape, a trapezoidal matrix can be used to transform the flat image into an expected shape. Additionally, module 404 may estimate 3D geometry, orientation, and trajectory of a printed package or object for use in estimating a captured image. This may include a visual representation of the package in 3D as well as an orientation and trajectory which might describe interaction with the printed package or object, e.g., front of store checker motion and/or customer interaction with the printed package or object on the shelf or rack.

Module 404 may also receive device specific information, e.g., information pertaining to an anticipated capture device. The capture device is defined as any of the devices used to capture data or images of printed objects or samples. The device parameters may include geometric, spatial, and spectral properties defined by a device form factor, modes of operation, and sensors. Examples of capture devices include RGB scanners, red LED POS scanners, mobile and other camera systems, and scanning or manual spectrophotometers and densitometers.

Signal prediction module 406 operates to predict encoded signal characteristics of the encoded signal within the encoded design file, e.g., as represented by contour and/or device capture modifications to the Spectral proof. This Signal prediction module 406 accepts image data, e.g., multiple image blocks and their locations as input, and generates a signal robustness metric(s) as output. For example, a grayscale image can be constructed from the estimated reflectance spectrum (output of BLESS 402) at or around 660 nm, and then modified by contour and/or capture device information provided by Module 404. Image areas, such as blocks or tiles, from the modified gray scale image are analyzed by module 406. The output can be in any format that is derived from a signal robustness metric. For example, it can be an image of the same size (width and height) as the input grayscale image, with a heat map indicating the signal strength distribution. The heat map can be alternatively applied to a constructed Lab image (or other color space), the construction utilizing the estimated reflectance spectra from the BLESS module 402. Or the output can be a single value such as a probability measure based on the heat map or other computations, or an array of pixels or image areas with an associated strength metric or value. Still further, a swipe metric, as discussed in Assignee's U.S. Pat. No. 9,690,967 and application Ser. No. 15/154,529 (U.S. Pat. No. 10,217,182), filed May 13, 2016, which are each hereby incorporated herein by reference in its entirety, can be used to predict encoded signal strength of the encoded design file and to provide alternative outputs. A detectability prediction can be decided for sub-blocks of an image, e.g., based on an orientation component and/or message carried by an encoded signal. For example, a detection metrics can be determined for a 128×128 pixel (or smaller) area. This will allow precision predictability across an image.

Visibility of the modified, encoded design file can be predicted in Visibility module 408. For example, the methods and system described in assignee's U.S. Pat. No. 9,565,335, which is hereby incorporated herein in its entirety, can be employed. This module 408 can accept, e.g., an original version of the design file without encoding, and an encoded version. For example, a Lab image can be generated from the output of the BLESS module 402, as modified, if any, by module 404. The output of this module 408 can be a visibility map, e.g., as discussed in our U.S. Pat. No. 9,565,335 patent. The visibility map can predict luminance and/or chrominance differences across the image and/or within local image areas.

Both the signal prediction 407 and visibility map 409 can be provided back to the signal encoder 200 to help adjust signal encoding. For example, the signal prediction 407 may indicate areas that include relatively low signal strength, e.g., as compared relatively to a threshold, benchmark or target signal strength. Signal strength then can be increased in these areas. Or, the visibility map 409 may indicate that the encoded image may have areas that would benefit from a decrease in signal strength to avoid encoding noise or aesthetic distractions.

System 400 can cooperate with or include various other modules 202, 204 and/or 206.

A QC module 202 may evaluate or compare signal strength and/or visibility predictions relative, e.g., to a physical capture of a printed encoded design or printed encoded Artwork. Comparison information can be used to validate the system 400 output, or provide evidence that one or more system 400 modules need to be updated. For example, comparison information may help train the Poly Model discussed above relative to FIG. 5B. Or the comparison information may be used to adjust the press database or device capture information.

The UX (or "user experience") module 206 can assign a score or grade based on, e.g., a particular device, uses experience and/or environment. For example, an encoded package or printed object may have a higher readability score when used in certain lighting with a portable smartphone vs. in dimly lit areas with red LED POS system.

Grade Module 204 may combine information from signal prediction module 407 and package geometry into a single grade per package side (or total package) for an ideal capture device. Additionally, this module 407 may utilize the so-called swipe information discussed in assignee's U.S. patent application Ser. No. 15/154,529 (U.S. Pat. No. 10,217,182) and in U.S. Pat. No. 9,690,967, each of which is hereby incorporated herein by reference in its entirety. There are some arguments on how to define a "grade". In one implementation, we use an "aggregation" approach; such a transform converts an array of signal strength values into a single value. The output of the aggregation can be a "grade." In this case, the "grade" is independent of device and user behavior. In other cases, a "grade" can be assigned according to a signal robustness for a given geometry and/or capture device.

Additional grading features and technology follow below.

Figure 9:
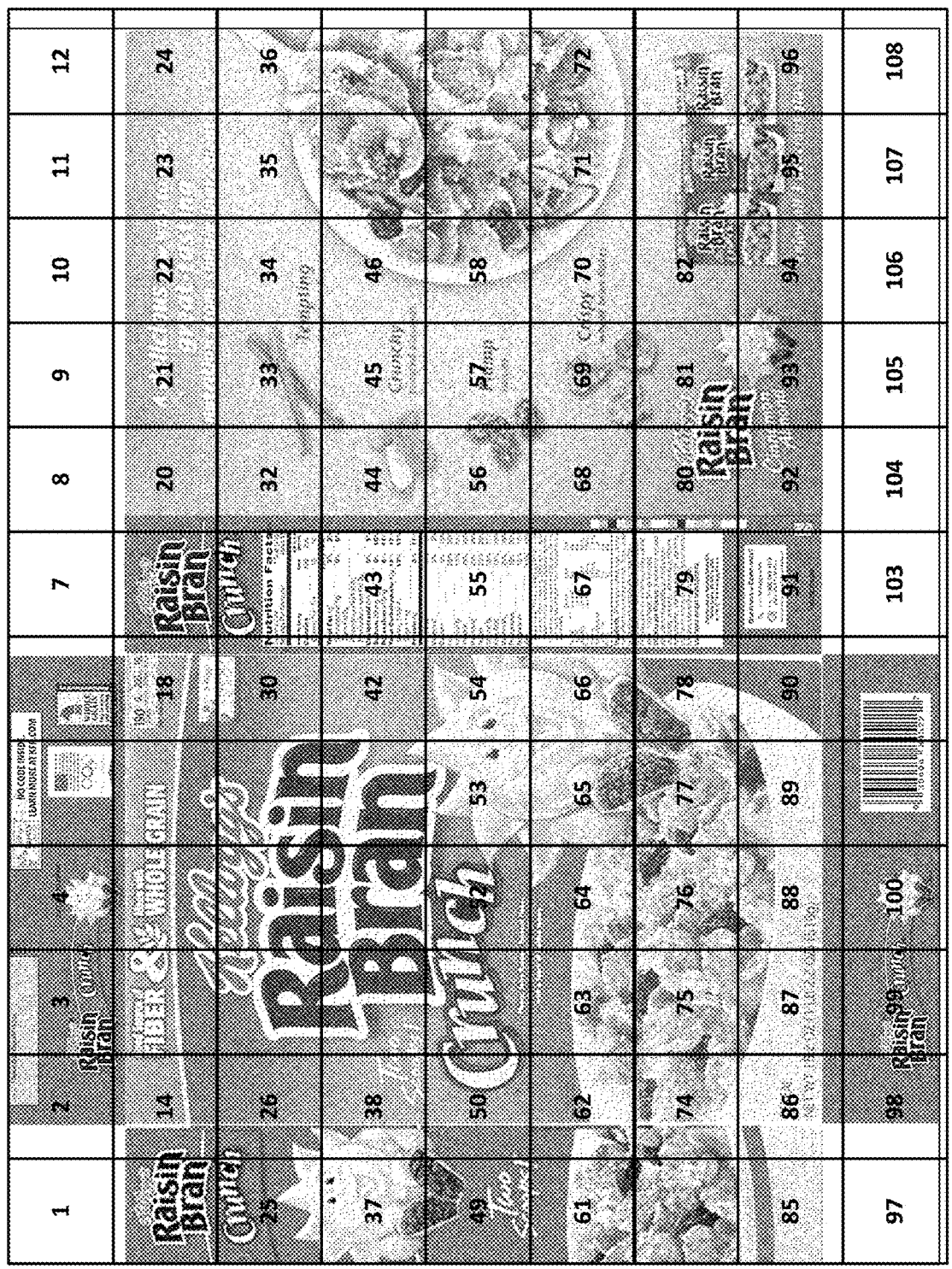
FIG. 9 depicts a printed cereal carton blank, with tiled watermark blocks made visible.

FIG. 9 shows a cereal carton blank, including tiled watermark blocks made visible and sequentially numbered. In actual practice, of course, the watermark signal is imperceptible to human viewers.

Figure 10:
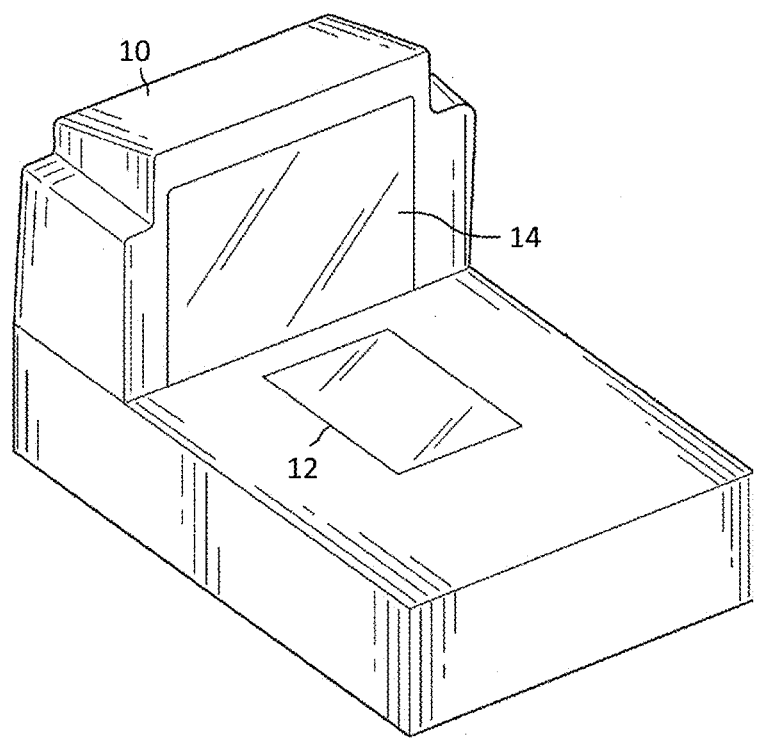
FIG. 10 shows a prior art bioptic scanner.

Retail stores increasingly employ bioptic scanners to capture imagery of packages presented for checkout. An illustrative prior art bioptic scanner 10 is shown in FIG. 10 and includes two glass windows—one horizontal 12, and one vertical 14—through which imaging optics capture depictions of retail packages as they are swiped past the scanner by a shopper or a clerk. Imagery is thus captured from both below the package, and from the side of the package. Depending on how the package is held during the swipe, different panels of a carton may be presented to different of the scanner windows.

Assuming a package is swiped with its sides oriented vertically and horizontally, the bioptic scanner may view the package in 24 different ways, as detailed in Table I:

TABLE I

| Horizontal scanner window sees: | Vertical scanner window sees: |
|---|---|
| 1 Front | Top |
| 2 Front | Left |
| 3 Front | Right |
| 4 Front | Bottom |
| 5 Top | Front |
| 6 Top | Right |
| 7 Top | Back |
| 8 Top | Left |
| 9 Left | Top |
| 10 Left | Front |
| 11 Left | Bottom |
| 12 Left | Back |
| 13 Right | Top |
| 14 Right | Front |
| 15 Right | Bottom |
| 16 Right | Back |
| 17 Back | Top |
| 18 Back | Left |
| 19 Back | Right |
| 20 Back | Bottom |
| 21 Bottom | Front |
| 22 Bottom | Right |
| 23 Bottom | Back |
| 24 Bottom | Left |

(There are 30 different combinations of two sides for a six-sided package, i.e., 6 * 5. There are six disallowed pairings: top/bottom, bottom/top, left/right, right/left, front/back, back/front.)

Since a bioptic scanner can "see" two panels of a carton at once, it can successfully decode information from the carton if either of the two panels has a readable signal. The overall reliability of detection, at a particular orientation, will depend on the reliability of detection of the two panels that are visible to the scanner at that orientation. A net reliability grade for a package can be determined by combining reliability scores for each of the 24 possible package presentations to the bioptic scanner, as detailed further below.

Each of these 24 reliability scores also depends on the directions with which the visible panels are swiped. (A swipe may be defined as movement of an object past the scanner in a horizontal direction, parallel to the line at which the planes of the horizontal and vertical scanner windows intersect.)

Consider a simple example: the front panel of a cereal box. It will be recognized that if this panel is swiped vertically (from its top to bottom, or bottom to top), there is a greater expanse of artwork from which and encoded signal might be read, than if this panel is swept horizontally. More frames of the front panel will be captured (e.g., by a scanner that captures 60 frames per second) if the panel is swept vertically than if the panel is swept horizontally, just because the vertical dimension is longer. With a greater number of captured frames that depict package artwork, there is a greater probability of detection While this result is intuitive, sometimes the localized layout of encoded signal in the artwork can lead to opposite results, e.g., in which a horizontal swipe of a cereal box front panel leads to more reliable decoding of information than a vertical swipe. See, e.g., the discussion of swipe metrics in cited application Ser. No. 15/154,529 (U.S. Pat. No. 10,217,182) and in U.S. Pat. No. 9,690,967, which are each hereby incorporated herein by reference in their entirety.

Vertical and horizontal swiping becomes a bit arbitrary when it comes to the top and bottom panels of a carton, which are normally oriented to be horizontal in both of their dimensions. A vertical swipe across the top/bottom panel of a 3D box is considered to be in a direction achieved if a vertical swipe across the front panel bends across the fold line and continues across the top/bottom panel. Thus, on a cereal box, a "vertical" swipe across the top or bottom panel traverses the narrow dimension of the panel.

While each panel can be swiped in two directions, there is only one direction in which a panel can be swiped when it is paired with an adjoining panel, in one of the Table I pairings. For instance, if the two panels visible to the scanner are the front and the left side, then the swiping motion must swipe both panels vertically. (The front panel can only be swiped horizontally if it is paired with the top or the bottom.)

Indeed, if the two panels visible to the scanner windows are both selected from the set {front, left, back, right}, then both panels will always be swiped vertically.

If one of the two panels visible to the scanner is the top or the bottom, and the other panel is the front or the back, then a swiping motion will always swipe the top/bottom and front/back panels horizontally.

If one of the two visible panels is the top or bottom, and the other panel is the left or right side, then a swiping motion will always swipe the top/bottom vertically, and will always swipe the left/right panels horizontally.

Thus, adding a swipe direction (indicated by -V for vertical and -H for horizontal) to each of the faces in Table I yields Table II:

TABLE II

| | Horizontal scanner window sees: | Vertical scanner window sees: |
|---|---|---|
| 1 | Front-H | Top-H |
| 2 | Front-V | Left-V |
| 3 | Front-V | Right-V |
| 4 | Front-H | Bottom-H |
| 5 | Top-H | Front-H |
| 6 | Top-V | Right-H |
| 7 | Top-H | Back-H |
| 8 | Top-V | Left-H |
| 9 | Left-H | Top-V |
| 10 | Left-V | Front-V |
| 11 | Left-H | Bottom-V |
| 12 | Left-V | Back-V |
| 13 | Right-H | Top-V |
| 14 | Right-V | Front-V |
| 15 | Right-H | Bottom-V |
| 16 | Right-V | Back-V |
| 17 | Back-H | Top-H |
| 18 | Back-V | Left-V |
| 19 | Back-V | Right-V |
| 20 | Back-H | Bottom-H |
| 21 | Bottom-H | Front-H |
| 22 | Bottom-V | Right-H |
| 23 | Bottom-H | Back-H |
| 24 | Bottom-V | Left-H |

Since there are six package faces, and each can be swiped in two different directions, there are twelve component swipes included in the above table. Each appears four times.

By combining reliability scores for the twelve possible swipes, a net reliability grade for the package can be determined.

With the foregoing by way of orientation, this specification now turns to further details of particular embodiments.

Figure 11:
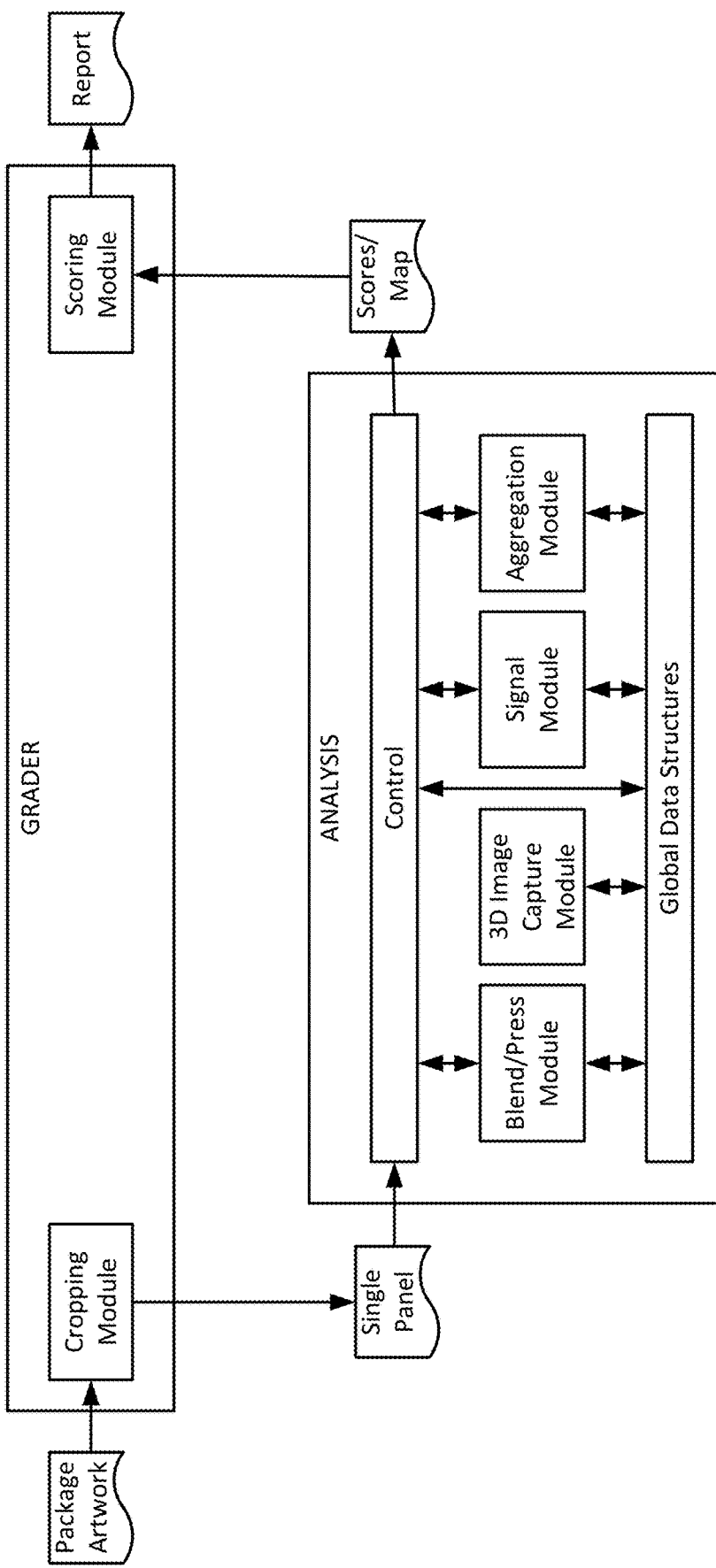
FIG. 11 is a diagram of an embodiment employing certain aspects of the present technology.

FIG. 11 shows an illustrative software system embodying aspects of the present technology. This system includes various modules that are implemented by corresponding software instructions (e.g., written in C++, Python or MatLab code), executing on one or more microprocessors, as further detailed below. The modules are grouped into two cooperating units—a Grader unit, and an Analysis unit.

The Grader unit includes two modules. The first Grader unit module, the Cropping module, takes package artwork and partitions it into separate component panels—six in the case of a carton. These artwork panels are individually processed by the Analysis unit. The second module of the Grader, the Scoring module, takes analysis results for the six different panels, and processes them to yield a net package grade and other evaluation data. These results are included in report data that is output from the Grader unit. Operations of the Cropping and Scoring modules are further detailed below.

The Analysis unit analyzes component panels of the package artwork and produces, for each, a heat map and swipe scores. The Analysis unit includes four principal elements, which are invoked in sequence on each panel of artwork: a Blend/Press module, a 3D Image Capture module, a Signal module, and an Aggregation module. Cooperation and data exchange between these modules, and the Grader unit, is effected by a Control module, which operates in conjunction with shared data structures (e.g., implemented in semiconductor or disk storage).

The Blend/Press module simulates the effect of printing on the artwork image. It takes, as input, a digital art file comprising one or more layers of cyan, magenta, yellow, black and spot color inks. Dot gain for each of the ink layers on the target printer, and the ICC profile for the printer, can also be specified. The color profile can further include the white point (brightness) for the target paper stock.

The Blend/Press module outputs a spectral proof, representing the color coming off the press, as it would be detected by a spectrophotometer. In particular, each pixel is represented by its reflectance at 36 different wavelengths (380 nm, 390 nm, 400 nm . . . ) through the visible spectrum. The module also produces a grayscale file, indicating sensing of the package to a point-of-sale scanner with illumination only at a wavelength of 660 nm. Two other greyscale files can also be produced to assess performance of the package as seen by a mobile device (e.g., smartphone) camera: one for watermarks in which the signal is encoded as variations in luminance (aka "luma" watermarks), and one for watermarks in which the signal is encoded as variations in color (aka "chroma" watermarks). Only wavelengths near the red, green and blue Bayer filter wavelengths are retained. These three wavelengths are weighted differently in constructing spectral proofs for luma vs. chroma.

Additional information about operation of the Blend/Press module is found in the earlier-cited patents.

(A down-sampling module can be optionally provided before the Blend/Press module, to down-sample the full resolution artwork image by a factor of 3 or 4, to yield imagery with a scale of 100 or 75 pixels per inch.)

The 3D Image Capture module simulates the effect of scanning the artwork-printed package, using a point of sale scanner or a mobile device. This module receives, as input, a grayscale file output by the Blend/Press module, and camera characteristics (i.e., empirically-determined noise, blur, focal length, and camera tilt, associated with a camera model). The package shape can also be specified: flat or cylindrical. The module outputs a list of watermark tiles. (For a cylindrical shape, the tiles are processed to represent curvature.) The tiles represent what the device sees.

The application of a camera model to planar and cylindrical target images is familiar to artisans versed in photogrammetry.

The Signal module takes the output from the 3D Image Capture module and estimates the probability of watermark detection for a rectangular (typically square) local region around each pixel. These pixel-centered probabilities, when aggregated across a region, yield a heat map-like strength of local watermark signal strength. (For a point-of-sale scanner, a single heat map is produced, indicating detection of the watermark at the 660 nm wavelength commonly used by such scanners. For a mobile device camera, two heat maps are produced—one for a luma-encoded signal, and another for a chroma-encoded signal.)

These local regions typically correspond to patches of the package artwork having the size of the watermark message blocks. Each such message block on the printed package may comprise a 128×128 array of watermark elements ("waxels"). If there are 75 waxels per inch in the package artwork, then each printed message block is 128/75, or 1.7 inches on a side. If printed at 300 dots per inch resolution, then each watermark message block comprises a 512×512 pixel region of package artwork—with each waxel spanning a 4×4 pixel area.

These just-stated pixel data, however, are for the original artwork, to be printed on the package. The 3D Image Capture module yields a different set of imagery, which may be of different resolution due to the focal length of the camera model, etc. But the local regions for which signal strength is determined still typically correspond, in size, to the size of the watermark blocks as represented in the imagery output from the 3D Image Capture module (here termed a "tile").

For each pixel in imagery output by the 3D Image Capture model, the Signal module determines a strength of the watermark calibration signal (sometimes termed the registration, reference, or grid signal), and also determines a strength of the message signal, for a tile centered on the pixel. These two signal strengths are combined (e.g., averaged) into a probability score for that pixel-centered tile, in the range 0.0 to 1.0.

(To display the resulting heat-map over the original artwork, the heat map can be interpolated back to the resolution of the original package artwork.)

As with the other modules, additional information on operation of the Signal module can be found in the earlier incorporated-by-reference patent applications. Additional information on determining localized watermark signal strength is found in application Ser. No. 15/816,098, filed Nov. 17, 2017 (issued as U.S. Pat. No. 10,593,007), and in U.S. Pat. Nos. 7,054,461 and 7,286,685. The disclosures of these documents are incorporated herein by reference in their entireties.

The Aggregation module produces various types of scores for each artwork panel, based on the probability scores output by the Signal module.

One type of score is a Swipe score. There are two sub-classes of Swipe score: one represents scanning the panel artwork horizontally (a row-wise score) and one represents scanning the panel artwork vertically (a column-wise score). Each is expressed as a watermark detection probability, between 0% and 100%.

In computing the row-wise Swipe score, each row in the panel artwork is virtually scanned multiple times. Each scan comprises multiple spaced-apart views taken along the row, with a random starting offset (since the first image of the package depends on how the timing of the frame captures, e.g., at 60 frames per second, corresponds to the package position).

The number of image frames that will be captured depend on the speed at which the package is swiped past the scanner. Exemplary swipe speeds typically range from 5-40 inches per second. The system can use a fixed swipe speed in this range, or randomized swipe speeds can be employed. Naturally, the slower the swipe speed, the more frames are captured, and the more densely-spaced are the blocks of package imagery that can be analyzed by the scanner.

The spacing of views (i.e., the number of views per row) also varies among the scans, to account for the different frame rates of POS scanners, and the different speeds at which a person may swipe the package past the scanner. Random variations can be employed (With a frame capture rate of 60 frames per second, and a package swept at 5 inches per second, each successive frame depicts the package 0.0833 inches further along its travel. With a frame capture rate of 30 frames per second, and a package swept at 40 inches per second, each successive frame depicts the package.)

For each scan of a row, a score is produced, combining the probability p of a successful read at each of the views along the row of tiles. If $p_i$ is the probability of a successful watermark read from tile i, and T is the number of tiles scanned, then the single scan score for a row j is computed as:

$$scanScore_j = 1-((1-p_1)*(1-p_2)*(1-p_3)* \ldots *(1-p_T))$$

A final score S for each row is computed as the average of all the single scan scores for that row (i.e., with different view spacings and initial offsets).

A final horizontal swipe score (row-wise score) SwipeScore$_R$ for the panel artwork is the average of all row scores S down the extent of the panel artwork.

A corresponding process is likewise applied to columns to produce a final vertical swipe score (column-wise score) SwipeScore$_C$.

The Swipe class of scores is suited for point of sale scanners, in which multiple images of a package are captured while the package moves relative to the camera. A different score—termed a Local score, is used to determine read reliability with mobile cameras. This Local score is simply the average of all the tile scores (as produced by the Signal module) included in that artwork panel. Two Local scores can be produced—one based on luma watermark encoding, and one based on chroma watermark encoding.

Back now to the Grader unit, the Scoring module produces several different evaluations of the package: a Package score, a Coverage Area score, and a Coverage Value score.

The Package score makes use of the 12 SwipeScores produced by the Aggregation module (the row-wise and column-wise score for each of the six artwork panels on the package) to yield a score between 0% and 100%. This score aims to simulate the probability of a successful watermark decode when the package is manually swiped past a bioptic scanner.

Recall that the package can be swiped in any of 24 different orientations. Each orientation consists of a unique combination of two package faces, each of which is swiped in one of two directions, as detailed in Table II. The probability of detection, for each face/direction, was determined by the Aggregation module, as discussed above.

For each combination k of two sides x and y, a read reliability score can be computed as:

$$Score_k = SwipeScore_x + SwipeScore_y - (SwipeScore_x * SwipeScore_y)$$

By computing $Score_k$ for each of the 24 combinations of panels/swipe directions in Table II, and averaging (dividing by 24) a net package score can be derived.

This score gives equal weight to each of the 24 different combinations of package faces. A different score weights each of the 24 combination scores based on the total area of its two scanned sides, relative to the total surface area of the package. That is:

$$weight_k = (area_x + area_y)/area_{package}$$

Then:

$$weightedScore_k = Score_k * weight_k$$

The sum (or average) of the 24 weighted scores can be used as the overall weighted grade for the package.

Rather than weight the k $Score_k$ based on scanned surface area, these component scores can be weighted based on an estimate of their frequency of occurrence.

Not all package presentations to a scanner are equally likely. Shoppers and clerks commonly handle packages in their canonical orientations, e.g., with their top panels up. This tends to bias the orientations at which items are swiped past the scanner. As a consequence, some of the 24 different package orientations detailed in Table II occur more commonly than others. Historical scanner data may be analyzed to determine which presentations occur with which probabilities. The 24 $Score_k$ values can be weighted with their respective presentation probabilities, and then be combined (e.g., by averaging or summing) to yield a presentation-weighted package score.

For mobile devices, Package scores are easier to compute, since there are no combinations of package sides and swipe directions to consider.

For each side k of package p, several different scores can be calculated:

$$weight_k = area_k/area_p$$

$$weightedChromaScore_k = chromaScore_k * weight_k$$

$$weightedLumaScore_k = lumaScore_k * weight_k$$

$$weighted\ ChromaLumaScore_k = LocalScore_k * weight_k$$

The scores for the individual k sides are summed over (or averaged across) the package's six sides to yield the overall scores, e.g.:

$$overallChromaScore = weightedChromaScore_1 + \ldots + weightedChromaScore_6$$

$$overallLumaScore = weightedLumaScore_1 + \ldots + weightedLumaScore_6$$

$$overallChromaLumaScore = weightedChromaLumaScore_1 + \ldots + weightedChromaLumaScore_6$$

The Coverage Area score, produced by the Scoring module, is a calculation of how much of the package area is covered by watermark signal over a given threshold of strength.

The heat map produced by the Signal module is composed of strength pixels, e.g., in the range of 0-255. The total number of pixels for which the heat map strength is over a threshold value, such as 82, are counted ("coveredPixels"). The Coverage Area score then relates that pixel area to the total package area:

$$coverageArea = imageArea * (coveredPixels/totalPixels)$$

The Coverage Value score is different. It is the sum of the Local scores for the package sides, weighted by the relative areas of the package sides, and adjusted in scale. A value between 0 and 255 is produced (i.e., indicating score on the same scale as pixel intensity).

For each side s of package p:

$$percent_s = area_s/area_p$$

$$weightedScore_s = LocalScore_s * percent_s$$

Then if there are six sides:

$$coverageValue = (weightedScore_1 + \ldots + weightedScore_6) * 255$$

The Analysis unit operates on each of the six package panels in isolation. However, these six portions are not typically available separately. They are composed, stored, and distributed, as a single digital file depicting composite artwork, e.g., as shown in FIG. 14. (This layout is sometimes termed a "press sheet." The "X" indicia have been added, and are discussed below.) The task of partitioning these portions falls to the Cropping module.

Originally, applicant employed a graphic artist to manually segregate the six portions of the artwork. The artist performed this task using a mouse or stylus—starting with the front panel and clicking in one corner of its artwork, and dragging to the opposite corner—thereby highlighting this panel. The Analysis unit was then invoked on the highlighted front panel. This operation was repeated five more times, for the portions of the artwork corresponding to the other five panels of the product. (To avoid the requirement of labeling each panel, this manual procedure was performed on panels in in a prescribed order: front, then back, then right, then top, then left, and then bottom.) The graphic artist was thus required to manually manipulate a pointer to twelve different locations in the artwork, in a specified sequence. As may be expected, this workflow was susceptible to various errors.

In accordance with a further aspect of the technology, only six—not twelve—corner points are identified within the artwork. And in a preferred embodiment, the six points represent 3 pairs of coordinates, with each pair represented as such in the identification. So the rectangles (pairs) can be identified in any order, but preferably not the corners. Of course, the points may be presented in any order, but from an interface perspective—people will more naturally think in terms of rectangles, e.g., paired points. From these points, all twelve corner points of the six artwork portions are identified, and the portions are respectively labeled as to their sides. By such method, the process is speeded, and there are fewer opportunities for errors to be introduced.

FIGS. 13A-13D illustrate one of the complications that must be confronted. While the front, left, back and right side panels (collectively the "side panels") always adjoin each other in the artwork, the top panel can adjoin any of the four side panels. The direction of a vertical (column-wise) swipe across the top panel, in the artwork, depends on which of the side panels it adjoins.

Figure 13A:
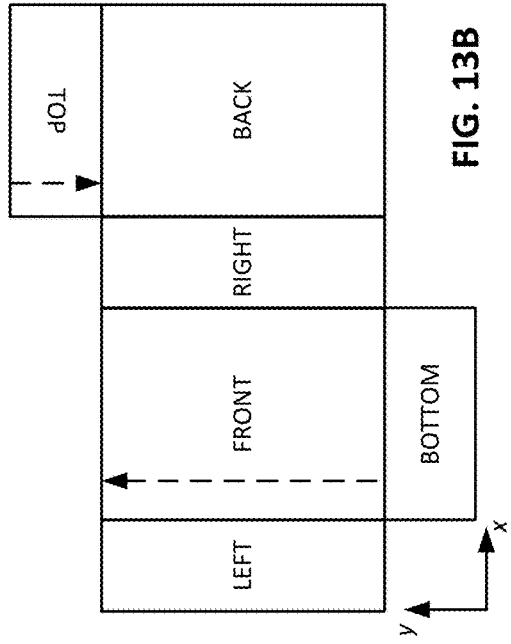
FIGS. 13A-13D show different layouts of a press sheet, and the different swipe directions across the top panel.
Figure 13B:
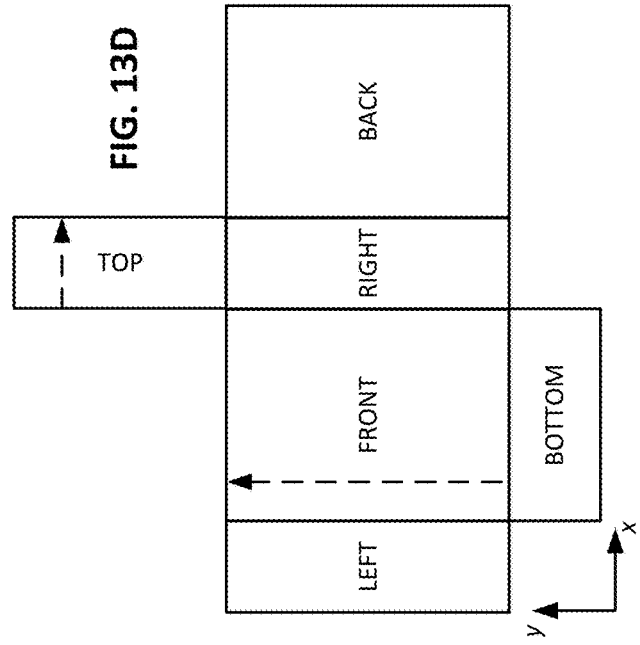
Figure 13C:
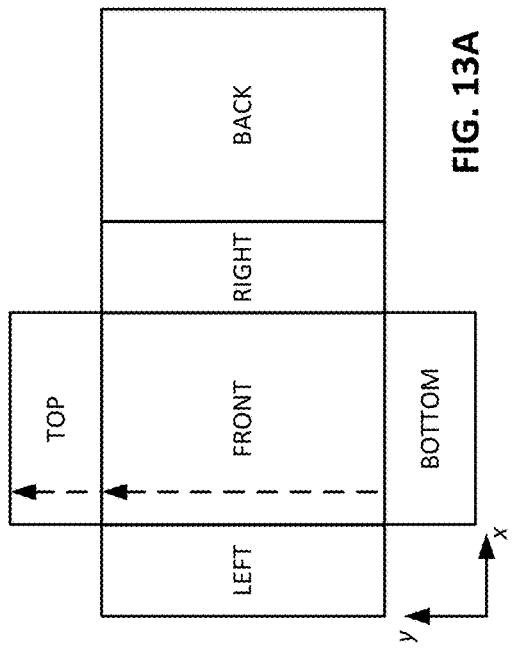
Figure 13D:
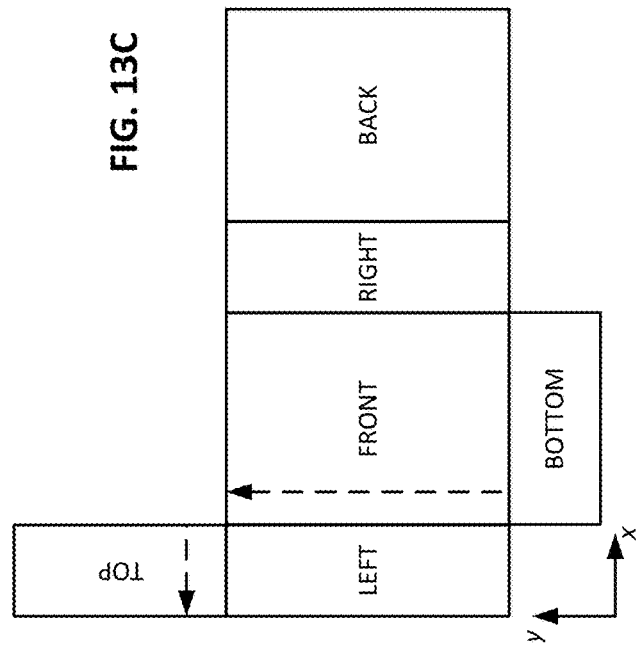

Each of the figures shows vertical swipes through the front and top panels by a dashed arrow. In FIGS. 13A and 13B, the vertical swipe through the top portion is vertical in the coordinate system of the artwork (i.e., parallel to the y axis). In FIGS. 13C and 13D, the vertical swipe through the top portion is horizontal (i.e., parallel to the x axis).

The same issue likewise arises with the bottom panel. The artwork layout of a 6-faced package may thus have any of 16 different appearances: the top panel may be in any of the four positions shown in FIGS. 13A-13D, and the bottom panel may be in any of four similar positions (but at the bottom of the side panels).

The following is a method that partitions the six component panels for separate analysis, by identifying six pairs of corner points. Referring to FIG. 14, two opposing corner points are defined for each of three rectangles 61, 62 and 63, which collectively encompass the entire package artwork 64. In this example, first rectangle 61 is the top panel, rectangle 62 spans the side panels, and rectangle 63 is the bottom panel. Which pair of opposing corners, used to identify each rectangle, does not matter. In other cases, the same pair of opposing corners (upper-left and lower-right or upper-right and lower-left) are used for all 3 rectangles. In FIG. 14, the upper left and lower right corners are used.

Rectangle 61 is defined by corners labeled A and B. Each of these corners is characterized by two coordinates, one along an x axis, and one along a y axis. Rectangle 62 is similarly defined by corners labeled C and D, and rectangle 63 is defined by corners labeled E and F.

The three dimensions of the assembled, 3D, carton may be termed height h (e.g., along the y dimension of the front panel), width w (e.g., along the x dimension of the front panel), and depth d (e.g., the short dimension of the left side panel).

FIG. 15 is like FIG. 14, but without the rectangles; only the six corner points have been marked. The following Table III shows the x and y coordinates for each of the six points (here, in the inch-based coordinate system of the patent drawing):

TABLE III

|   | x    | y    |
|---|------|------|
| A | 6.69 | 7.01 |
| B | 8.94 | 6.07 |
| C | 2.50 | 6.07 |
| D | 8.94 | 3.08 |
| E | 3.48 | 3.08 |
| F | 5.72 | 2.11 |

If the corner points are identified in an arbitrary order, then a first task is to pair the corner points for three rectangles.

The point with the largest y value is one of the two corner points for the top panel. From the above table, this must be point A. Its opposing corner has, as its y value, the second-largest y value in the table, so it must be point B or C. The other of B or C belongs to the middle rectangle. Of course, knowing the six points as 3 pairs of coordinates helps determine package orientation.

The point with the smallest y value is one of the two corner points for the bottom panel. From the above table, this must be point F. Its opposing corner has, as its y value, the second-smallest y value in the table, so it must be point D or E. The other of D or E belongs to the middle rectangle.

So the middle rectangle is defined by one of four pairs of corner points: {B,D}, {B,E}, {C,D} or {C,E}. The correct corner pairing is the pair with the greatest distance between the corners. By summing the squared difference between the x coordinates, with the squared difference between the y coordinates, for each of the four candidate corner pairs, the pairing {C,D} is found to have the greatest distance. It thus defines the middle rectangle.

{A,B} must then define the first rectangle, and {E,F} must define the third rectangle.

The smaller dimension of the first rectangle is the package depth d. This is the smaller of the differences between its corners' x coordinates, or its corners' y coordinates. From Table III, it is seen that the smaller distance is 7.01-6.07, or 0.94.

The longer dimension of the first rectangle is the package width w. This is the larger of the differences between its corners' x coordinates, or its corners' y coordinates. From Table III, it is seen that this larger distance, w, is 8.94-6.69, or 2.25.

The height h is the distance between the y coordinates of the two corner points defining the middle rectangle, {C,D}. From Table III, this is 6.07-3.08, or 2.99.

Figure 16:
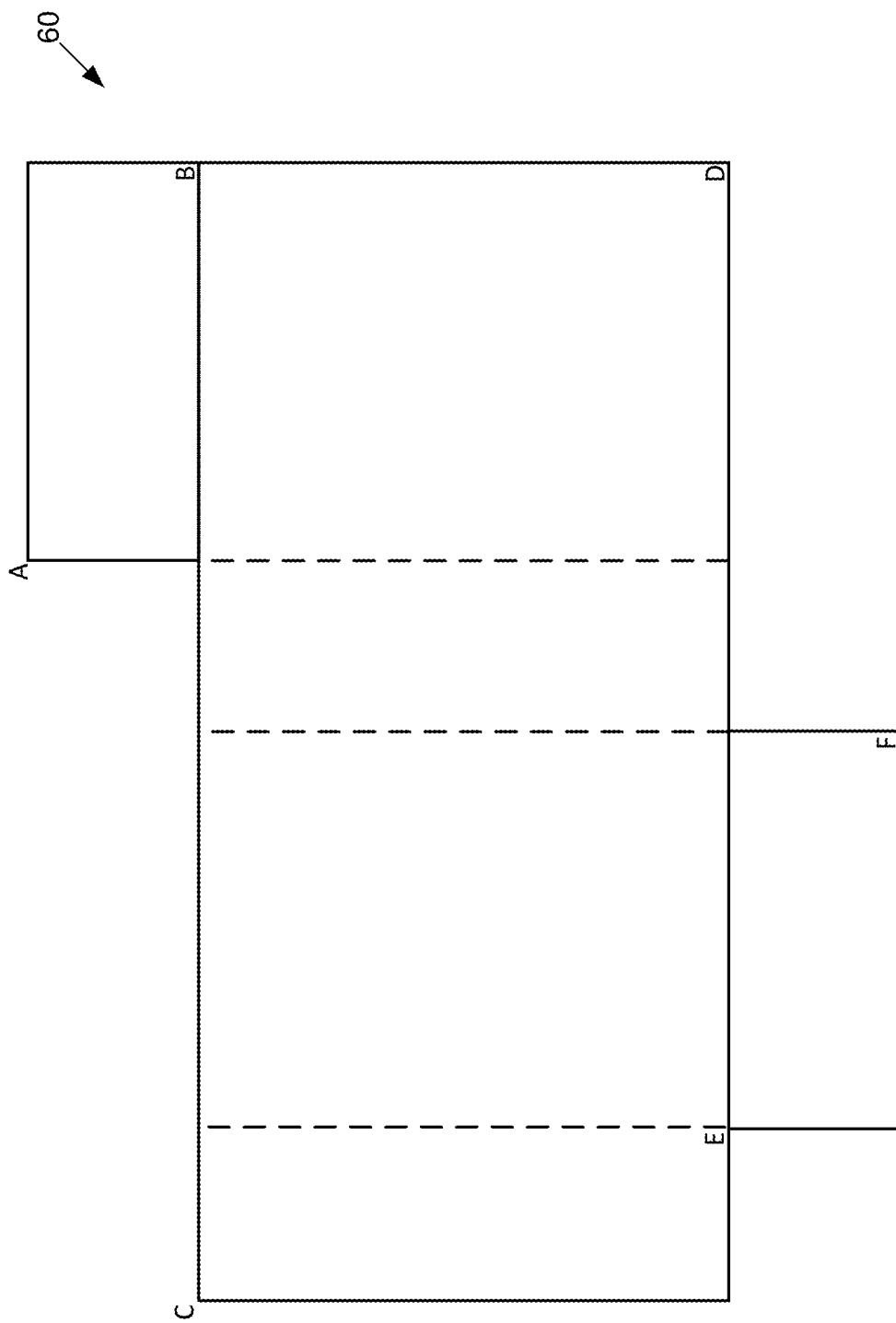

After the three rectangles have been identified by their respective corners, and the height/width/depth have been determined, the six panels of artwork can be defined. The top and bottom have already been defined by the first and third rectangles, so what remains is to divide the large second rectangle into four panels. This can be done by extending a line, from the vertical edges of the top and bottom panels, through the large second rectangle, as shown by the dashed lines in FIG. 16. In the illustrated case, all 4 panels are then immediately demarked.

Somewhat more complicated is the example of FIG. 17A, where the top and bottom panels are opposite each other, and adjoining one of the edge panels of the middle rectangle. In this case, extending the vertical edges of the top/bottom panels through the middle rectangle yields just one of the 3 fold lines included in the middle rectangle (again shown by a dashed line).

A second fold line is found by moving along the bottom of the large middle rectangle, in a direction away from the top/bottom panel, a distance equal to the y dimension of the bottom panel, $y_b$. At this location, a fold line 91 vertically crosses the large rectangle.

As shown in FIG. 17B, a third fold line is found by moving in from the far edge of the middle rectangle (the edge remote from the top/bottom panels) by this same distance $y_b$. At this location, a fold line 92 vertically crosses the large rectangle.

The four panels within the middle rectangle are thereby identified. A first is defined by point C (earlier identified), and the point (call it U) at which the fold line 92 crosses the opposite side of the middle rectangle. The x coordinate of point U is the x coordinate of point C, shifted by the distance $y_b$. (Whether it is shifted to the left or right depends on whether the top/bottom tabs are on the left or right side of the press sheet, respectively.) The y coordinate of point U is the y coordinate of point C or D—whichever is larger A second panel is defined by two further corner points, V and E. The x coordinate of point V is the x coordinate of point E, shifted by the distance $y_b$. (Whether it is shifted to the left or right depends on whether the top/bottom tabs are on right or left side of the press sheet, respectively.) The y coordinate of point V is the y coordinate of point C or D—whichever is larger. (Point E, which is diagonally opposite point V in the second central panel, was identified earlier.)

By the foregoing arrangement, the locations of the six pairs of corner points, defining the locations of the six panels of package artwork, are established. These six pairs are:

{A,B}
{C,U}
{U,V}
{V,E}
{E,B}
{E,F}

The first pair defines the package top. The last pair defines the package bottom. The middle four define the package sides. Of these four pairs, the two with the greatest distance between the points define the front and back panels; the other pairs define the left and right panels.

Figure 18A:
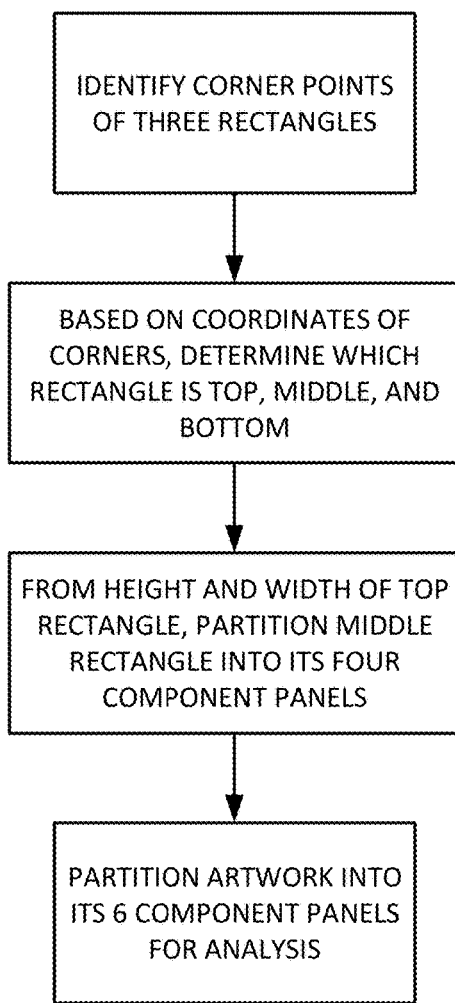
FIGS. 18A and 18B are flow charts detailing aspects of the present technology.
Figure 18B:
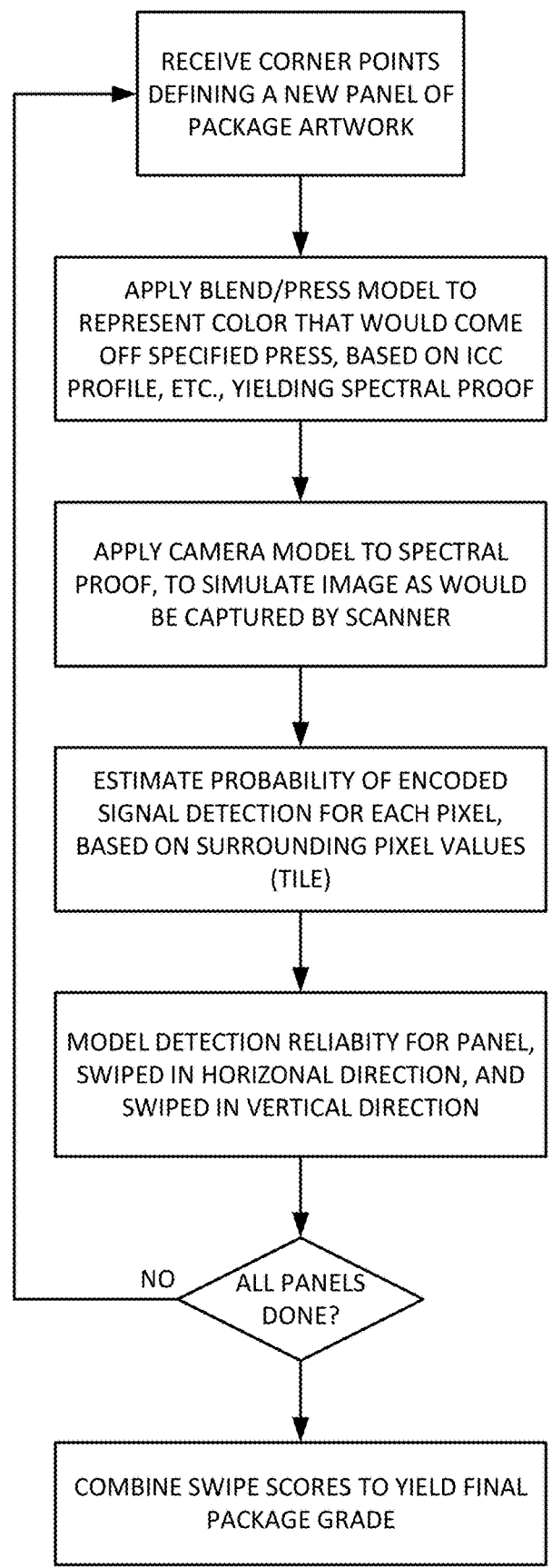

The above processes are reviewed in the flow charts of FIGS. 18A and 18B.

Figure 19:
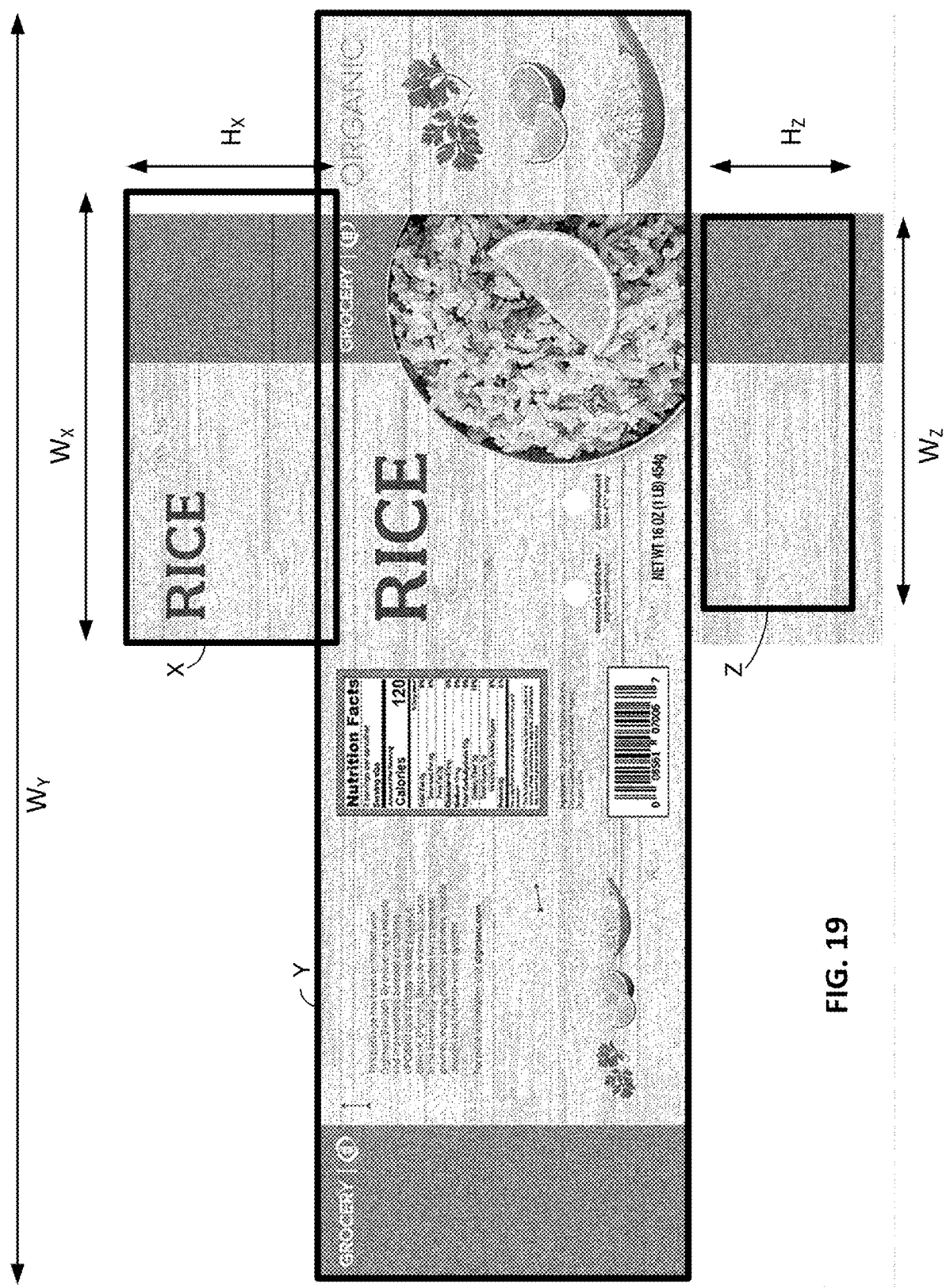
FIG. 19 illustrates how corner points can be mis-located, and the consequent mis-identification of component rectangles.

It is unlikely that a human operator—selecting the starting corner points (of the three rectangles)—will precisely identify each of the six points. Some "slop" is inherent. Consider FIG. 19, which shows the three rectangles (here labeled X, Y, Z) of FIG. 12, imperfectly-identified. Small inaccuracies in the initial dimensions can be propagated and magnified as the sides are calculated, and it's possible to end up with sides that either don't fill or exceed the area of the middle rectangle.

To address this problem, an illustrative embodiment determines the height and width of each of the three rectangles: $(H_X, W_X)$, $(H_Y, W_Y)$, $(H_Z, W_Z)$.

A primary dimension P is determined by averaging the primary dimension of the top rectangle (its width Wx, in this case) with the corresponding dimension of the bottom rectangle (its width Wz, in this case):

$$P=(Wx+Wz)/2$$

(The primary dimension of the top rectangle is the one that aligns with the orientation of the package: the x-axis for top-to-bottom packages, the y-axis for left-to-right packages.)

A secondary dimension S is determined by subtracting 2*P from the primary dimension of the middle rectangle (Wy) and dividing the result by 2:

$$S=(Wy-2*P)/2$$

Figure 20:
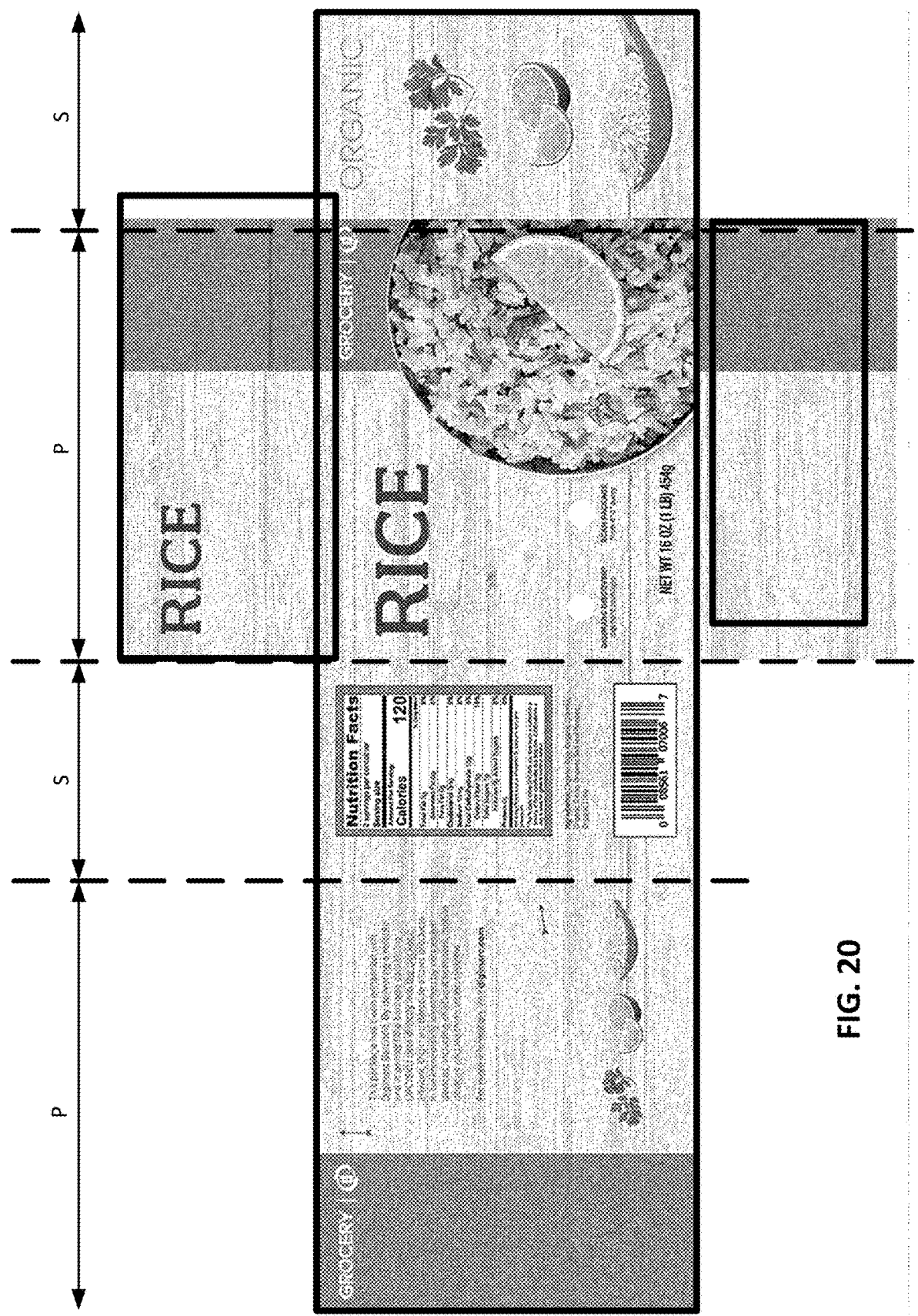
FIG. 20 illustrates aspects of a method that minimizes errors due to the FIG. 19 mis-location of corner points.

The middle rectangle is then divided into four panels: two of width P, and two of width S. Vertical lines (shown in dash) can extend up and down from this middle rectangle, and their extensions above and below can be substituted for the near-but-not-quite side edges of the top and bottom panels, as shown in FIG. 20. The corner locations can be revised accordingly.

In some embodiments, it is not necessary to distinguish the front and back panels; they are treated identically in determining swipe scores (e.g., because their areas are the same). Likewise regarding the left and right panels. In other embodiments, in which scoring depends on which panel is the front, the front panel can be identified by a selection received from a human operator, through a graphical user interface. This interface presents, on a screen, the largest two panels that have been identified from the middle rectangle, and asks the user to click on the panel that is the front. In another embodiment, the front panel is assumed to be the panel that adjoins the top panel (provided the top panel adjoins the larger middle rectangle along the top panel's longer edge).

The identification of the six starting points can be performed by a human operator, clicking with a mouse or stylus on a screen display of the artwork press sheet. Alternatively, these points can be determined algorithmically.

Such an algorithm starts by applying an edge filter to the artwork, to identify straight edges having a length greater than a threshold value (e.g., longer than an inch). Various edge detection methods are known; most look for boundaries across which the image intensity function rapidly changes (e.g., a peak in the derivative function, or gradient). Suitable methods include Canny and Sobel. Straight lines can be identified by trying multiple possible lines through the artwork, and determining how many detected edge points each line passes through. The Hough transform provides a fast way to do this. In some cases, edges that are not vertical or horizontal are discarded. (The Canny, Sobel, and Hough methods are familiar to artisans.) In other cases, edges within a predetermined tolerance, e.g., 1°-15°, are maintained for processing.

Once the vertical and horizontal straight edges have been identified, they are checked to filter out most of the edges that are internal to the package artwork. This can be done by checking that one side of the edge is bounded by white pixels (the blank part of the press sheet), and that such white area extends for at least a threshold distance away from the edge. Edges lacking this attribute are discarded.

A final check looks for those edges whose end points are each coincident (e.g., within some predetermined tolerance) with an end point of a different edge. If an edge does not meet this test, it is discarded. Edges surviving this test meet end-to-end and form a closed polygon.

Figure 12:
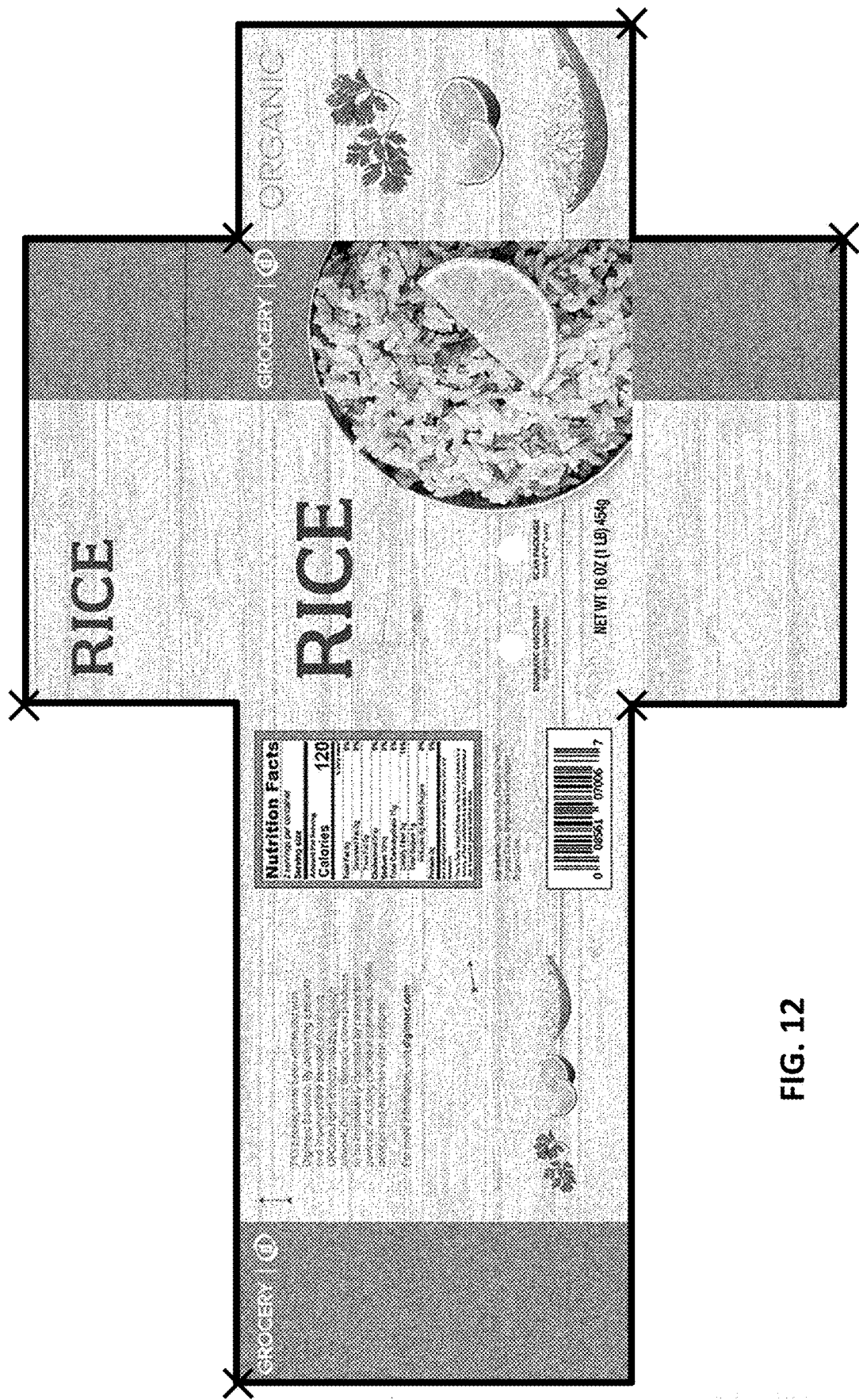
FIG. 12 shows a press sheet, with border and six corner points identified by an illustrative embodiment of the present technology.

The just-detailed algorithm identifies, in FIG. 12, the edges shown in black. The resulting polygon will have the shape of a large rectangle (the middle rectangle 62 of FIG. 14), to which two smaller rectangles (rectangles 61 and 63) join. The locations of opposing corner points of each of these three rectangles are determined (shown by "X"s in FIG. 12), and stored as the six corner points.

(Despite the noted filtering of edges, sometimes errant edge features within the artwork will persist. For example, if the threshold distance for white pixels on one side of edges is set to a small value, the edges around the Nutrition Facts box may survive the filtering, and define an interior polygon. A final filtering step is applied, to discard any edge having an endpoint inside an area bounded by one of the three rectangles.)

The just-detailed algorithm works in most, but not all, cases. For example, if a package has a tab closure—like the tops of many cereal boxes—then the tab feature can confuse the algorithm. In case of such failure, the artwork can be referred to a human operator for manual identification of the six points defining the three principal rectangles.

Once the six panels have been identified, the direction of a "vertical" swipe across the top and bottom panels, as presented in the press sheet, can be determined. Referring again to FIGS. 13A-13D, the aspect ratio of the top panel is determined. If it is wider (i.e., distance in the x direction) than it is tall (i.e., distance in the y direction), then a "vertical" swipe across the top panel is in the same direction as "vertical" through the front and back panels. Inversely, if the top panel is narrower than it is tall, then a "vertical" swipe across the top panel is perpendicular to "vertical" through the front and back panels.

From the foregoing it will be recognized that the present technology models the readability of a package when swept past a bioptic scanner in any of its 24 possible orientations, and advantageously predicts a net score indicating its overall bioptic readability. If the package artwork yields a net score below a target threshold, the artwork can be revised to obtain better performance—before the artwork is used to print thousands (or millions) of package blanks. The method also facilitates dividing-up the package artwork into its component panels for directional swipe analysis, with reduced involvement of a human operator, and reduced chance of error.

Figure 8:
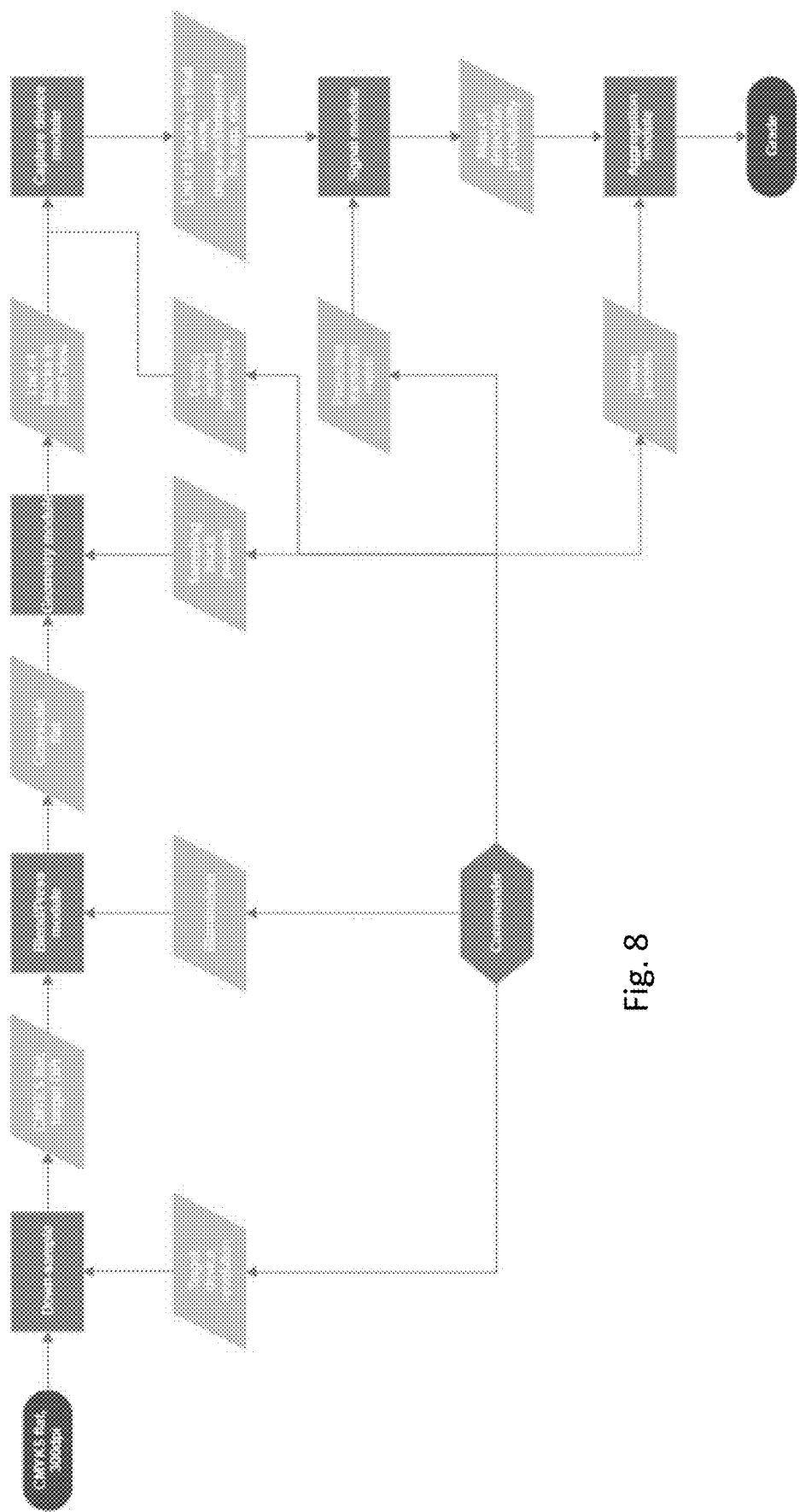
FIG. 8 is another diagram showing image processing flow.

Some operational and working details for one example are provided with reference to FIG. 8.

Image data (e.g., CMYKS) is provided for robustness and visibility analysis. The image data likely includes an encoded signal. In this example, the image data is a 300 DPI flat image (e.g., representing 1 side of a package) and can be downsampled, e.g., by factor of 2, 3, 4 or 5 (to 150, 100, 75 or 60 DPI), depending on an expected image capture device resolution. Downsampling factors determined by experimentation for a Point of Sale (POS) scanner and Android devices include: POS, 100 DPI; and Android devices, 75 DPI. The downsampled image data is provided to a BLESS module, which determines spectral characteristics of the image data. This is an estimate of how the image data will look when printed on a particular substrate, e.g., by a particular printing press. This output can be considered a spectral proof representing the color coming off press as would be detected by a spectrophotometer. This output can be on a pixel by pixel basis, potentially represented by reflectance of multiple (e.g., 12-48) wavelengths in range [380 nm, 390 nm, 400 nm, . . . 730 nm]. For a red-LED illumination point of sale scanner, the output includes only spectra at or around 660 nm wavelength(s), e.g., as a grayscale flat image. For other reading devices, e.g., an Android or iPhone device under full color or ambient illumination, two grayscale files can be produced, e.g., one for luma, one for chroma. In some implementations, only wavelengths near R, G, and B are retained as derived from application of 3 separate filters to full spectrum data.

The grayscale image is provided to a geometry module. For example, to model trapezoidal package geometry (e.g., yogurt cup), cylindrical geometry (e.g., soup can) or other geometry.

Decoding blocks can be selected, e.g., depending on capture device or preselection. The blocks can be degraded, e.g., according to an expected 3D image captured device module. For example, image degradation for a particular device can be modeled, and then applied to the image data. The degradation model can introduce noise, scaling, rotation, blurring, filtering etc. into the image. The signal module takes the output from the 3D Image Capture module and estimates the probability of signal detection for a rectangular (typically square) local region around each pixel. A map of detection probabilities can be determined, for aggregation as discussed above.

The commander module in FIG. 8 is a controller to help provide operation parameters, e.g., illumination specifics (e.g., 660 nm), device specifics (e.g., point of sale scanner) and other parameters to help yield.

III. Operating Environment

The components and operations of the various described embodiments and implementation shown in FIGS. 4, 5A, 5B, and 8, and/or discussed in text above, can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. For example, the systems and methods described with reference to FIGS. 4 and 5. One such realization of such implementations is electronic circuitry that has been custom-designed and manufactured to perform some or all of the component acts, as an application specific integrated circuit (ASIC).

To realize such implementations, some or all of the technology is first implemented using a general purpose computer, using software such as MatLab (from MathWorks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes signal prediction (e.g., system 400) operating on a specifically configured smartphone (e.g., iPhone 7 or Android device) or other mobile device, such phone or device. The smartphone or mobile device may be configured and controlled by software (e.g., an App or operating system) resident on the smartphone device. The resident software may include, e.g., a digital watermark detector, BLESS module 402, and modules 404, 406 and 408.

Figure 6:
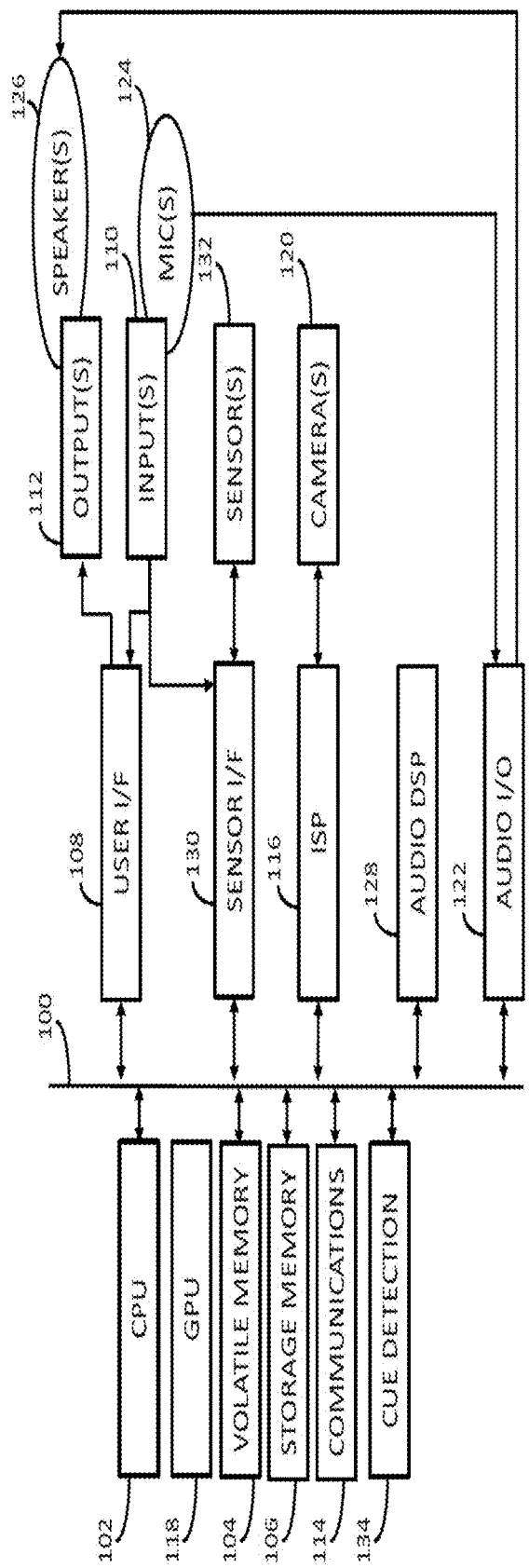
FIG. 6 is a diagram of an electronic device (e.g., a smartphone, mobile device, tablet, laptop, computer or other electronic device).

For the sake of further illustration, FIG. 6 is a diagram of a portable electronic device (e.g., a smartphone, mobile device, tablet, laptop, computer, wearable or other electronic device) in which the components of the above systems, processes and modules (e.g., those in FIGS. 4 and 5A and 5B and 8) may be implemented. Of course, not all of the illustrated components are necessary. The following reference numbers refer to FIG. 6, and not any of the other drawings, unless expressly noted.

Referring to FIG. 6, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 6 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A10, A8 or A7. By way of further example, the A8 is built on a 64-bit architecture, includes a motion co-processor and is manufactured on a 20 nm process. The CPU 102 runs an operating system of the electronic device, runs application programs (e.g., mobile apps such as those available through application distribution platforms such as the Apple App Store, Google Play, etc., or custom designed to include signal decoding and icon detection) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. Encoded signal decoding and icon detection capabilities can be integrated into the operating system itself.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, an illumination source such as a flash or torch, a buzzer, a haptic actuator, a loud speaker, or the like or any combination thereof. In the case of an iPhone 6, the flash includes a True Tone flash including a dual-color or dual-temperature flash that has each color firing at varying intensities based on a scene to make sure colors and skin tone stay true.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's indigo press. An encoded object may include, e.g., a consumer packaged product, a label, a sticker, a logo, a driver's license, a passport or other identification document, etc. Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. Such imagery may correspond with image data utilized in Artwork in FIG. 4. General functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker. GPU 118 may also be configured to serve one or more functions of a signal decoder, or as any of FIG. 4 modules 202, 204, 402, 404, 406 and/or 408. In some cases GPU 118 is involved in encoding signals in Artwork (e.g., FIG. 4, item 200).

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensor(s) 132. Sensor 132 can, for example, include an accelerometer (e.g., for sensing acceleration, orientation, vibration, etc.), a magnetometer (e.g., for sensing the direction of a magnetic field), a gyroscope (e.g., for tracking rotation, orientation, or twist), a barometer (e.g., for sensing air pressure, from which relative elevation can be determined), a wind meter, a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 6, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110.

The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations and embodiments, it will be recognized that the technology can be implemented in many other, different, forms. To provide a comprehensive disclosure without unduly lengthening the specification, applicant hereby incorporates by reference each of the above referenced patent documents in its entirety.

The particular combinations of elements and features in the above-detailed embodiments and implementations are exemplary only; the interchanging and substitution of these teachings with other teachings in this and the incorporated-by-reference patents and documents are also contemplated.

What is claimed is:

1. An image processing system comprising:
   an input to receive a design file, the design file comprising an encoded design including an area of layered colors, the encoded design comprising an encoded signal carrying a plural-bit identifier;
   a blend module for operating on the encoded design, the blend module generating reflectance spectra estimates for the encoded design including for the area of layered colors, the reflectance spectra estimates associated with a blend of a cyan component, a magenta component and a yellow component, the reflectance spectra estimates provided on a per pixel basis for the encoded design, the blend module generating a grayscale encoded design representation corresponding to the reflectance spectra estimates at or around 660 nm;
   a signal strength module for producing a representation of encoded signal detectability, the signal strength module operating on a transformed version of the grayscale encoded design representation generated from the reflectance spectra estimates at or around 660 nm.

2. The image processing system of claim 1 further comprising an output for outputting the representation of the encoded signal detectability.

3. The image processing system of claim 2 further comprising a visibility module for generating a visibility map of a color image representation of the encoded design generated from a weighted sum of the reflectance spectra estimates, and in which the representation of the encoded signal detectability comprises a heat map overlay on the color image representation of the encoded design generated from a weighted sum of the reflectance spectra estimates.

4. The image processing system of claim 1 further comprising a signal encoder which generates the encoded design.

5. The image processing system of claim 4 in which the signal encoder comprises a digital watermark encoder.

6. The image processing system of claim 1 further comprising an image warping module for transforming the grayscale encoded design representation generated from the reflectance spectra estimates at or around 660 nm, the image warping module transforming the encoded design according to an object form factor, and in which the object form factor comprises a cylinder or trapezoid.

7. An image processing method comprising:
   receiving a digital design comprising an encoded signal carrying a plural-bit identifier, the digital design including an area of layered colors to be printed on a substrate;
   generating reflectance spectra estimates for the digital design including for the area of layered colors as if printed on the substrate including reflectance spectra estimates involving a cyan component, a magenta component and a yellow component, the reflectance spectra estimates provided on a per pixel basis for the digital design;
   generating a grayscale image representation of the digital design from the reflectance spectra estimates at or around 660 nm;
   generating a representation of encoded signal detectability from the grayscale image representation; and
   providing the representation of encoded signal detectability to influence signal encoding.

8. The image processing method of claim 7 in which the signal encoding comprises digital watermarking.

9. A method of generating a detection grade for a 3D object comprising plural panels, comprising:
   receiving a digital design comprising an encoded signal carrying a plural-bit identifier, the digital design including an area of layered colors to be printed on a substrate;
   generating reflectance spectra estimates with a color blend model for the digital design including for the area of layered colors as if printed on the substrate, the area of layered colors representing cyan, magenta and yellow, the reflectance spectra estimates provided on a per pixel basis for the digital design;
   generating a grayscale image representation of the digital design from the reflectance spectra estimates, including modeling an illumination source with a peak illumination occurring in a spectral range between 630 nm to 710 nm;
   defining plural pairs of adjoining panels associated with the 3D object;
   determining an encoded signal detectability grade for each of the plural pairs of adjoining panels from the grayscale image representation; and
   combining the grades to yield a net detection grade for the 3D object.

10. The method of claim 9 in which the digital design comprises artwork for later printing on a flat substrate, the printed flat substrate to be later folded to define the 3D object, wherein the artwork includes six rectangular portions, corresponding to six panels of the 3D object, said method further comprising:
    establishing x- and y-coordinates for six points in the digital design; and
    from the six points, determining twenty four different ordered pairs of object panels that may be respectively presented to first and second faces of a bioptic scanner.

11. The method of claim 10 in which said establishing x- and y-coordinates includes:
    establishing x- and y-coordinates for two opposing corners of one of the six rectangular portions; and
    establishing x- and y-coordinates for two opposing corners of another of the six rectangular portions.

12. A non-transitory medium comprising instructions stored thereon to configure a multi-core processor to perform the method of claim 9.

13. A non-transitory computer readable medium comprising instructions stored thereon that, when executed by one or more electronic processors, cause the one or more electronic processors to perform the following:
- accessing a design file, the design file comprising an encoded design including an area of layered colors, the encoded design comprising an encoded signal carrying a plural-bit identifier;
- generating reflectance spectra estimates for the encoded design including for the area of layered colors, the reflectance spectra estimates associated with a color blend of a cyan component, a magenta component and a yellow component, the reflectance spectra estimates provided on a per pixel basis for the encoded design, and generating a grayscale representation corresponding to the reflectance spectra estimates at or around 660 nm;
- producing a representation of encoded signal detectability by operating on a transformed version of the grayscale representation generated from the reflectance spectra estimates at or around 660 nm.

14. The non-transitory computer readable medium of claim 13 in which said instructions, when executed by one or more electronic processors, cause the one or more electronic processors to perform the following: outputting the representation of the encoded signal detectability.

15. The non-transitory computer readable medium of claim 14 in which said instructions, when executed by one or more electronic processors, cause the one or more electronic processors to perform the following: generating a visibility map of a color image representation of the encoded design generated from a weighted sum of the reflectance spectra estimates, and in which the representation of the encoded signal detectability comprises a heat map overlay on the color image representation of the encoded design generated from a weighted sum of the reflectance spectra estimates.

16. The non-transitory computer readable medium of claim 13 in which said instructions, when executed by one or more electronic processors, cause the one or more electronic processors to perform the following: encoding a signal in the design file.

17. The non-transitory computer readable medium of claim 16 in which the encoding comprises a digital watermarking.

18. The non-transitory computer readable medium of claim 13 in which said instructions, when executed by one or more electronic processors, cause the one or more electronic processors to perform the following: transforming the grayscale representation generated from the reflectance spectra estimates at or around 660 nm, the transforming transforms the encoded design according to an object form factor, and in which the object form factor comprises a cylinder or trapezoid.

* * * * *